United States Patent
Ukishima

(10) Patent No.: US 9,792,514 B2
(45) Date of Patent: Oct. 17, 2017

(54) IMAGE INSPECTION METHOD AND APPARATUS, AND INK JET PRINTING APPARATUS

(71) Applicant: FUJIFILM Corporation, Tokyo (JP)

(72) Inventor: Masayuki Ukishima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 72 days.

(21) Appl. No.: 15/083,317

(22) Filed: Mar. 29, 2016

(65) Prior Publication Data
US 2016/0292526 A1 Oct. 6, 2016

(30) Foreign Application Priority Data
Mar. 31, 2015 (JP) .................... 2015-073594

(51) Int. Cl.
*G06K 9/03* (2006.01)
*H04N 1/00* (2006.01)
*B41J 2/21* (2006.01)
*G06K 9/44* (2006.01)

(52) U.S. Cl.
CPC .............. *G06K 9/03* (2013.01); *B41J 2/2142* (2013.01); *B41J 2/2146* (2013.01); *G06K 9/44* (2013.01); *H04N 1/00005* (2013.01); *H04N 1/00015* (2013.01); *H04N 1/00045* (2013.01); *H04N 1/00063* (2013.01)

(58) Field of Classification Search
CPC ...... G06K 9/00442; G06K 9/03; G06K 9/036; G06K 9/44; G06T 5/002; G06T 5/20; G06T 7/0002; G06T 2207/20036; G06T 2207/20182; G06T 2207/30144; G06T 2207/30168; G06T 2207/30176; H04N 1/00005; H04N 1/00015; H04N 1/00029; H04N 1/00031; H04N 1/00034; H04N 1/00045; H04N 1/00063; B41J 2/2132; B41J 2/2142; B41J 2/2146
See application file for complete search history.

(56) References Cited

U.S. PATENT DOCUMENTS

| 2005/0186002 A1* | 8/2005 | Matsutake .................. 400/63 |
| 2006/0115127 A1* | 6/2006 | Hatayama .................. 382/112 |
| 2011/0075890 A1* | 3/2011 | Yasuda et al. ............. 382/112 |

FOREIGN PATENT DOCUMENTS

JP 2001-297321 A 10/2001

* cited by examiner

*Primary Examiner* — Andrew W Johns
(74) *Attorney, Agent, or Firm* — Studebaker & Brackett PC

(57) ABSTRACT

Provided are image inspection method and apparatus, and an ink jet printing apparatus that can highly accurately detect a stripe defect. An inspection image obtained by an imaging device imaging a printed matter printed by an ink jet printing apparatus including a line head is acquired. Each of at least one non-scanning direction linear structural element that is a linear structural element in a direction not parallel to a direction of scanning by the line head relative to a medium is used to execute morphology processing of a grayscale image to thereby smooth the inspection image to create a first smoothed inspection image (S22, S24). A stripe defect extending in the scanning direction is detected by using at least (1) one of the inspection image and a second smoothed inspection image created based on the inspection image and (2) the first smoothed inspection image.

17 Claims, 19 Drawing Sheets

IMAGE INSPECTION METHOD AND APPARATUS, AND INK JET PRINTING APPARATUS

CROSS-REFERENCE TO RELATED APPLICATIONS

The patent application claims priority under 35 U.S.C. §119 to Japanese Patent Application No.2015-73594, filed on Mar. 31, 2015. Each of the above application(s) is hereby expressly incorporated by reference, in its entirety, into the present application.

BACKGROUND OF THE INVENTION

Field of the Invention

The present invention relates to an image inspection method and apparatus, and an ink jet printing apparatus, and particularly, to an image inspection technique for detecting a defect of an image printed by an ink jet printing apparatus using a line head.

Description of the Related Art

A method disclosed in Japanese Patent Application Publication JP2001-297321A is known as one of methods of inspecting a print defect in a printed matter. In a method disclosed in JP2001-297321A, an edge image extracted from an inspection image obtained by imaging a printed matter by a color camera and an edge image extracted from a reference image created in advance are compared, and edge information included only in the inspection image is detected as a defect on the printed matter. According to JP2001-297321A, a general edge enhancement filter represented by a Laplacian filter and the like is used to perform spatial filtering to create the edge image (paragraph 0027 and FIG. 4 of JP2001-297321A).

The method illustrated in JP2001-297321A is a detection method using the fact that a print defect often includes high-frequency components in a spatial frequency domain and is a method particularly suitable for detecting a spot-like defect isolated on the printed matter.

SUMMARY OF THE INVENTION

An ink jet printing apparatus of a single-pass printing system provided with a line head records an image by one scan carried out by relative movement of the line head and a medium. Therefore, when a nozzle of the line head becomes poor for some reason, and a non-firing nozzle or curvature of ejection occurs, a stripe defect is generated on the printed image at a part where the poor nozzle takes charge of printing. The stripe defect is generated as a stripe extending in a scanning direction when the line head performs scanning relative to the medium. The scanning direction when the line head performs scanning relative to the medium while conveying the medium relative to the line head is a direction parallel to a conveyance direction of the medium.

The following problems occur when the method described in JP2001-297321A is applied to the stripe defect.

[1] The "edge information" obtained by the edge enhancement filter and the "stripe information" corresponding to the stripe defect do not completely coincide. The stripe information normally included in the inspection image is degraded when the edge information is extracted from the inspection image, and the detection accuracy is deteriorated.

[2] Contour components of the image and "stripe-like" linear components are also extracted in extracting the edge information, and the components tend to cause a false detection.

The present invention has been made in view of the circumstances, and an object of the present invention is to provide image inspection method and apparatus, and an ink jet printing apparatus that can highly accurately detect a stripe defect.

To solve the problems, the following aspects of invention are provided.

A first aspect provides an image inspection method including: an inspection image acquisition step of acquiring an inspection image obtained by an imaging device imaging a printed matter printed by an ink jet printing apparatus including a line head; a first smoothed inspection image creation step of creating a first smoothed inspection image obtained by smoothing the inspection image by executing morphology processing of a grayscale image by using each of non-scanning direction linear structural elements that are at least one linear structural element set as a structural element of an image and that are linear structural elements in directions not parallel to a scanning direction in moving a medium relative to the line head to scan the medium by the line head; and a stripe defect detection step of detecting a stripe defect extending in the scanning direction by using at least (1) one of the inspection image and a second smoothed inspection image created based on the inspection image and (2) the first smoothed inspection image.

According to the first aspect, the degradation of the information of the stripe extending in the scanning direction included in the inspection image can be suppressed, and the stripe information can be accurately extracted compared to the conventional method. The components that cause a false detection, such as contour components of image, can be removed to accurately extract the information of the stripe extending in the scanning direction from the inspection image. As a result, the accuracy of the detection of the stripe defect can be increased.

A second aspect provides the image inspection method according to the first aspect, wherein a reference image is created in advance, a first smoothed reference image obtained by smoothing the reference image by morphology processing of a grayscale image is created by using each of the at least one non-scanning direction linear structural element, and the stripe defect is detected by using at least the inspection image, the first smoothed inspection image, the reference image, and the first smoothed reference image.

According to the second aspect, the contour components of the image extending in the scanning direction included in the reference image can be removed as noise. As a result, the stripe information can be more accurately extracted.

A third aspect includes the image inspection method according to the first aspect, further including a second smoothed inspection image creation step of creating the second smoothed inspection image obtained by smoothing the inspection image by morphology processing of a grayscale image by using each of linear structural elements included in a linear structural element group including each of the at least one non-scanning direction linear structural element and at least one scanning direction linear structural element that is a linear structural element in the scanning direction, wherein the stripe defect is detected by using at least the first smoothed inspection image and the second smoothed inspection image.

According to the third aspect, components of isolated points that are spot-like image components not extending in any direction of the scanning direction and the directions not parallel to the scanning direction can be removed from the inspection image. The stripe defect can be detected based on the image after isolated point removal.

A fourth aspect provides the image inspection method according to the third embodiment, wherein a reference image is created in advance, a first smoothed reference image obtained by smoothing the reference image by morphology processing of a grayscale image is created by using each of the at least one non-scanning direction linear structural element, a second smoothed reference image obtained by smoothing the reference image by morphology processing of a grayscale image is created by using each of linear structural elements included in a linear structural element group including each of the at least one non-scanning direction linear structural element and at least one scanning direction linear structural element that is a linear structural element in the scanning direction, and the stripe defect is detected by using at least the first smoothed inspection image, the second smoothed inspection image, the first smoothed reference image, and the second smoothed reference image.

According to the fourth aspect, the components of the isolated points can also be removed from the reference image, and the contour components of the image extending in the scanning direction included in the reference image can be removed as noise.

A fifth aspect provides the image inspection method according to any one of the first to fourth aspects, wherein first preprocessing is applied to the inspection image before execution of the morphology processing regarding the inspection image, and the morphology processing is applied to the inspection image after the application of the first preprocessing.

A sixth aspect provides the image inspection method according to the second or fourth aspect, wherein second preprocessing is applied to the reference image before execution of the morphology processing regarding the reference image, and the morphology processing is applied to the reference image after the application of the second preprocessing.

A seventh aspect provides the image inspection method according to the sixth aspect, wherein first preprocessing is applied to the inspection image before execution of the morphology processing regarding the inspection image, and the morphology processing is applied to the inspection image after the application of the first preprocessing.

An eighth aspect provides the image inspection method according to any one of the second, fourth, sixth, and seventh aspects, wherein the reference image is created based on image data used when the ink jet printing apparatus prints the printed matter.

A ninth aspect provides the image inspection method according to any one of the second, fourth, sixth, and seventh aspects, wherein the reference image is a reference read image obtained by imaging a printed image without the stripe defect.

A tenth aspect provides the image inspection method according to any one of the first to ninth aspects, wherein when the inspection image is a color image, the first smoothed inspection image is created for each channel of a color signal.

An eleventh aspect provides the image inspection method according to any one of the first to tenth aspects, wherein the number of non-scanning direction linear structural elements is set according to a condition of at least one of accuracy of the detection and processing time required for the process of the detection.

A twelfth aspect provides the image inspection method according to any one of the first to eleventh aspects, wherein a filter size of each of the linear structural elements is adjusted according to thickness of the stripe defect to be detected and resolution of the imaging device.

A thirteenth aspect provides the image inspection method according to any one of the first to twelfth aspects, wherein a linear structural element in a direction not parallel to the scanning direction and in which an angle relative to the scanning direction is smaller than a preset prescribed angle is assumed as a linear structural element in the scanning direction and is excluded from the non-scanning direction linear structural elements.

A fourteenth aspect provides the image inspection method according to any one of the first to thirteenth aspects, wherein the morphology processing includes a process of at least one of an opening process and a closing process and includes one of a maximum value image creation process of creating a maximum value image adopting a maximum value of each pixel from a processed image group obtained through the one of the processes and a minimum value image creation process of creating a minimum value image adopting a minimum value of each pixel from the processed image group obtained through the one of the processes.

A fifteenth aspect provides an image inspection apparatus including: an inspection image acquiring device that acquires an inspection image obtained by an imaging device imaging a printed matter printed by an ink jet printing apparatus including a line head; a first smoothed inspection image creating device that creates a first smoothed inspection image obtained by smoothing the inspection image by executing morphology processing of a grayscale image by using each of non-scanning direction linear structural elements that are at least one linear structural element set as a structural element of an image and that are linear structural elements in directions not parallel to a scanning direction in moving a medium relative to the line head to scan the medium by the line head; and a stripe defect detecting device that detects a stripe defect extending in the scanning direction by using at least (1) one of the inspection image and a second smoothed inspection image created based on the inspection image and (2) the first smoothed inspection image.

In the fifteenth aspect, matters similar to the matters specified in the second to fourteenth aspects can be appropriately combined. In this case, elements of stages (steps) of processes and operations specified in the image inspection method can be thought of as elements of the device that implements functions of corresponding processes and operations.

A sixteenth aspect provides a non-transitory computer-readable tangible medium recording a program for causing a computer to execute: an inspection image acquisition step of acquiring an inspection image obtained by an imaging device imaging a printed matter printed by an ink jet printing apparatus including a line head; a first smoothed inspection image creation step of creating a first smoothed inspection image obtained by smoothing the inspection image by executing morphology processing of a grayscale image by using each of non-scanning direction linear structural elements that are at least one linear structural element set as a structural element of an image and that are linear structural elements in directions not parallel to a scanning direction in moving a medium relative to the line head to scan the medium by the line head; and a stripe defect detection step of detecting a stripe defect extending in the scanning direction by using at least (1) one of the inspection image and a second smoothed inspection image created based on the inspection image and (2) the first smoothed inspection image.

In the sixteenth aspect, matters similar to the matters specified in the second to fourteenth aspects can be appropriately combined. In this case, elements of stages (steps) of processes and operations specified in the image inspection method can be thought of as elements of the program for realizing functions of corresponding processes and operations.

A seventeenth aspect provides an ink jet printing apparatus including: a line head including a nozzle array in which a plurality of nozzles that eject ink in an ink jet system are arranged; a relative movement device that moves a medium relative to the line head; an imaging device that obtains an inspection image by imaging a printed matter printed by attaching the ink ejected from the line head to the medium; a first smoothed inspection image creating device that creates a first smoothed inspection image obtained by smoothing the inspection image by executing morphology processing of a grayscale image by using each of non-scanning direction linear structural elements that are at least one linear structural element set as a structural element of an image and that are linear structural elements in directions not parallel to a scanning direction in moving the medium relative to the line head to scan the medium by the line head; and a stripe defect detecting device that detects a stripe defect extending in the scanning direction by using at least (1) one of the inspection image and a second smoothed inspection image created based on the inspection image and (2) the first smoothed inspection image.

In the seventeenth aspect, matters similar to the matters specified in the second to fourteenth aspects can be appropriately combined. In this case, elements of stages (steps) of processes and operations specified in the image inspection method can be thought of as elements of the device that implements functions of corresponding processes and operations. According to the present invention, the stripe defect extending in the scanning direction can be accurately detected.

DETAILED DESCRIPTION OF THE PREFERRED EMBODIMENTS

Hereinafter, preferred embodiments of the present invention will be described in detail with reference to the attached drawings.

Figure 1:
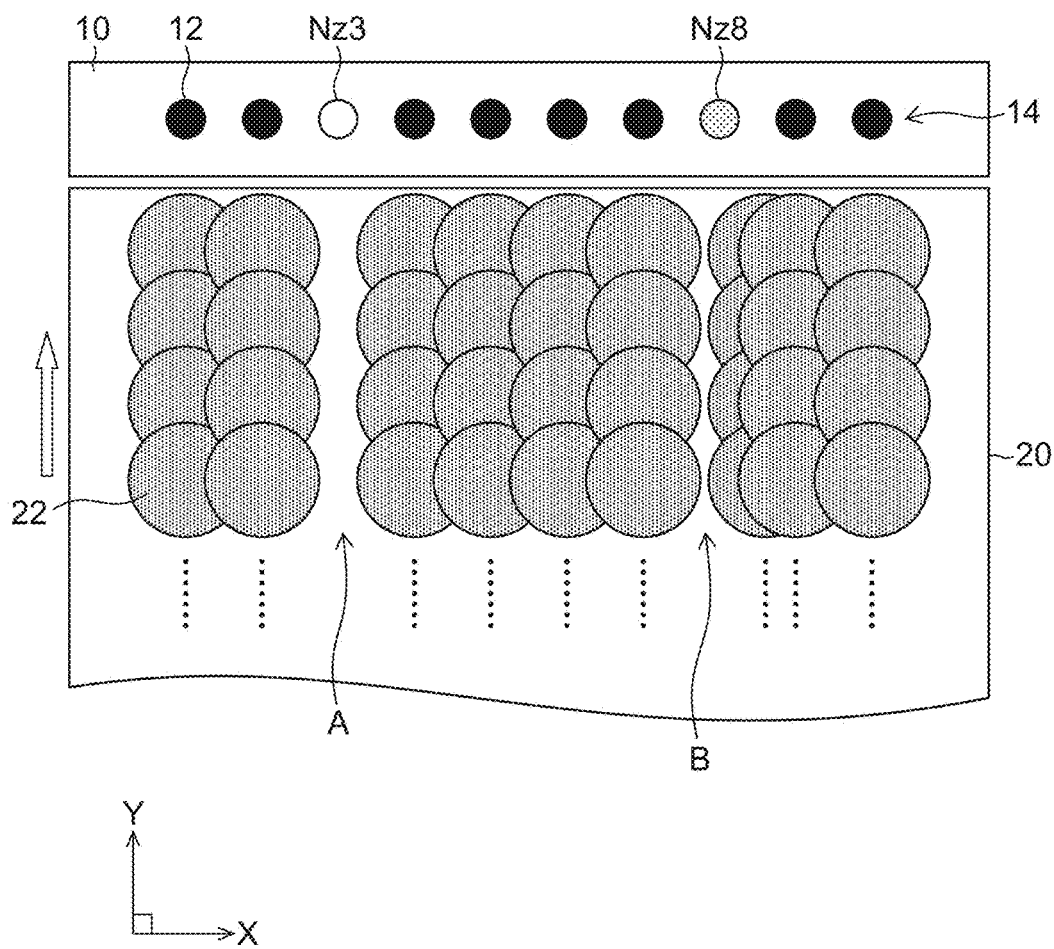
FIG. 1 is a schematic diagram for describing a stripe defect caused by a poor nozzle in a line-head ink jet printing apparatus.

FIG. 1 is a schematic diagram for describing a stripe defect caused by a poor nozzle in a line-head ink jet printing apparatus. The line-head ink jet printing apparatus denotes an ink jet printing apparatus including a line head. An example of a monochrome grayscale image will be described here to simplify the description. In a case of a color image, a similar process can be applied to each channel of each color. For example, when an inspection image obtained by imaging a printed matter is an RGB image including a grayscale image signal of each color of red (R), green (G), and blue (B), a process similar to the process described in the case of the monochrome grayscale image can be applied to a channel of each color signal of an R channel, a G channel, and a B channel.

A line head 10 is an ink jet head including a nozzle array 14 provided with a plurality of nozzles 12 that eject ink in an ink jet system. A medium 20 is conveyed relative to the line head 10, and the nozzles 12 eject droplets of the link. In this way, the droplets of the ink are attached to the medium 20, and dots 22 are recorded.

A medium conveyance direction that is a direction for conveying the medium 20 relative to the line head 10 will be called a Y direction, and a medium width direction that is a width direction of the medium 20 orthogonal to the Y direction will be called an X direction. The plurality of nozzles 12 of the line head 10 are lined up in the X direction, and each nozzle 12 records a different position in the X direction of the medium 20. The X direction that is a direction of arrangement of the nozzles 12 will be called a nozzle array direction in some cases.

The medium conveyance direction (Y direction) is a direction for scanning the line head 10 relative to the medium 20 and is equivalent to a "scanning direction". Although the relative movement of the line head 10 and the medium 20 is performed here by conveying the medium 20 relative to the line head 10, a configuration of moving the line head 10 relative to the medium 20 to relatively move the line head 10 and the medium 20 may also be adopted.

FIG. 1 illustrates the nozzle array 14 including a row of ten nozzles 12. As an example of a poor nozzle, a No. 3 nozzle Nz3 that is a third nozzle from the left of FIG. 1 is a non-firing nozzle. An example of generation of curvature of ejection is illustrated in a No. 8 nozzle Nz8 that is an eighth nozzle from the left. The non-firing nozzle is a nozzle that cannot eject the ink. The curvature of ejection is a phenomenon in which the ejection direction of the droplets is deviated, and the actual position of the formation of the dots is shifted from the ideal position of the formation of the dots. The ideal position of the formation of the dots is a target position in design and denotes a dot formation position expected when a normal nozzle ejects droplets.

In the situation shown in FIG. 1, a stripe defect extending in the Y direction is generated at a position (position indicated by character A in FIG. 1) of the medium 20 corresponding to the position of the No. 3 nozzle Nz3 that is a poor nozzle. A stripe defect extending in the Y direction is also generated at a position (position indicated by character B in FIG. 1) of the medium 20 corresponding to the position of the No. 8 nozzle Nz8 that is a poor nozzle. The stripe defect denotes a stripe-like image defect. The stripe defect includes a continuous stripe as well as an intermittent stripe.

In an ink jet printing apparatus of a single-pass printing system that moves the medium 20 relative to the line head 10 to complete recording of an image at a prescribed recording resolution by one scan, a poor nozzle generates a stripe defect extending in the scanning direction on the printed image.

In the present embodiments, characteristics of the line-head ink jet printing apparatus are used to accurately extract stripe information from the printed image. Specifically, the stripe information is extracted by morphology processing using a linear structure in a direction other than the scanning direction.

First Embodiment

Figure 2:
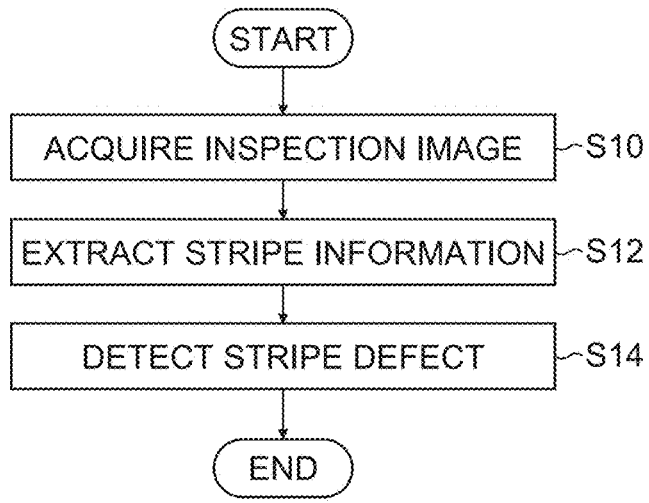
FIG. 2 is a flow chart showing a flow of a process in an image defect detection method according to a first embodiment.

FIG. 2 is a flow chart showing a flow of a process in an image inspection method according to a first embodiment. Each step of an image inspection process shown in FIG. 2 is executed by a control program incorporated into the image inspection apparatus, an image signal processing circuit, or a combination of these.

An image defect detection process shown in FIG. 2 includes an inspection image acquisition step of acquiring an inspection image (step S10), a stripe information extraction step of extracting stripe information from the acquired inspection image (step S12), and a stripe defect detection step of detecting a stripe defect based on the extracted stripe information (step S14).

The inspection image acquisition step (step S10) is a step of importing an inspection image to be inspected. An imaging device images a printed matter printed by the line-head ink jet printing apparatus to obtain the inspection image.

The imaging device is an apparatus that uses an imaging device represented by a CCD (charge-coupled device) sensor and a CMOS(complementary metal-oxide semiconductor device) sensor to convert an optical image into electronic image data. The imaging device may be a two-dimensional image sensor or may be a line sensor. A color imaging device may be adopted, or a monochrome imaging device may be adopted. A configuration of a combination of these is also possible.

A camera can be used as a mode of the imaging device. A scanner can be used as a mode of the imaging device. The scanner may be a flat-bed off-line scanner or may be an in-line sensor installed on a medium conveyance route of the ink jet printing apparatus. It is understood that the term imaging device is synonymous with an image reading device that reads a printed matter.

In the description here, a camera is used as the imaging device, and the camera images (reads) the printed matter to acquire an inspection image that is a monochrome grayscale image.

Other than a mode of directly acquiring the inspection image from the imaging device, the mode of acquiring the inspection image can be a mode of acquiring data of an inspection image obtained by the imaging device through a wired or wireless communication interface, a mode of acquiring data of an inspection image stored in a memory card or another portable storage medium, from the portable storage medium through a media interface, and the like.

Figure 3:
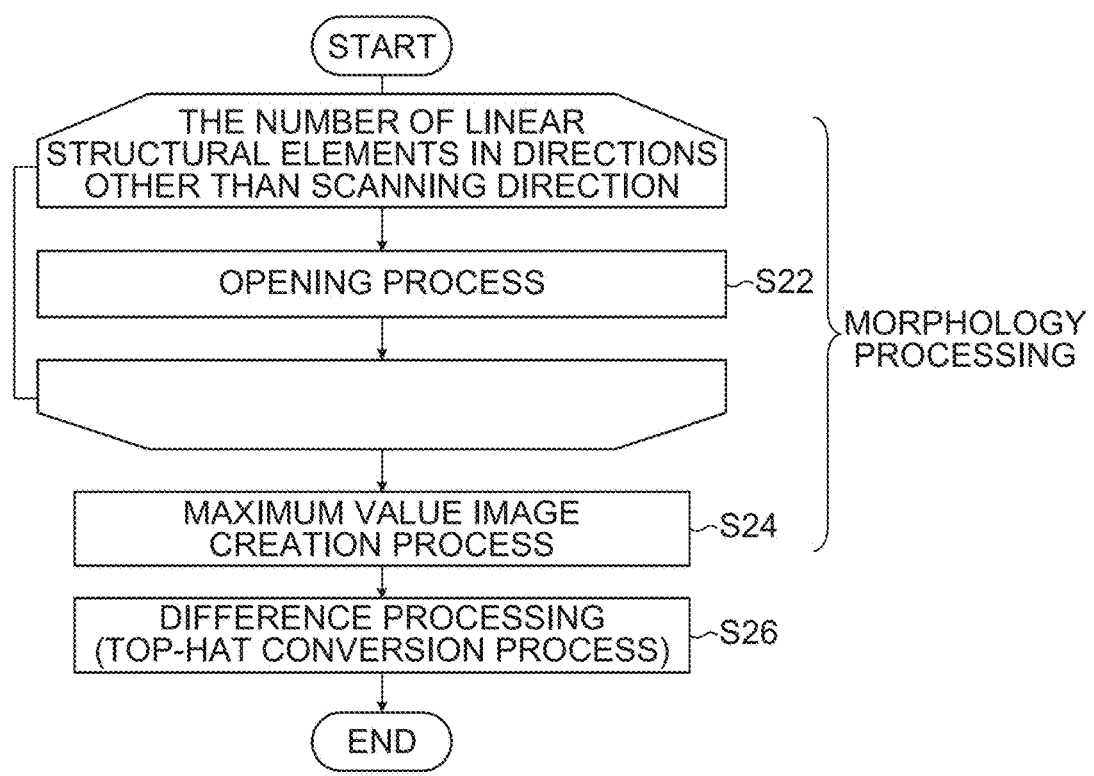
FIG. 3 is a flow chart showing details of a stripe information extraction process.
Figure 4:
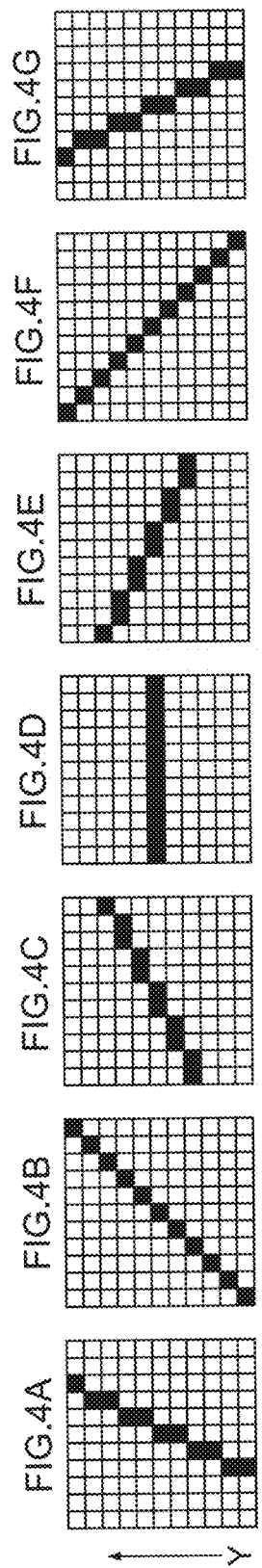
FIGS. 4A to 4G are diagrams showing examples of linear structural elements in directions other than a scanning direction.

FIG. 3 is a flow chart showing details of a stripe information extraction process carried out in the stripe information extraction step (step S12). The stripe information extraction process is a process of extracting information of a stripe as an image defect from the inspection image and can be understood as an image defect detection process.

The stripe information extraction process includes an opening process based on a linear structural element in a direction other than the scanning direction (step S22), a maximum value image creation process (step S24), and difference processing (step S26). In the first embodiment, the process from the opening process (step S22) to the maximum value image creation process (step S24) will be called morphology processing.

First, the opening process based on a linear structural element in a direction other than the scanning direction (step S22) is applied to the acquired inspection image. For the execution of the opening process (step S22), at least one linear structural element in a direction other than the scanning direction is set in advance as a structural element of the image.

Figure 5:
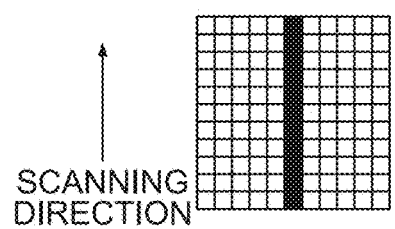
FIG. 5 is a diagram showing an example of a linear structural element in the scanning direction.

FIGS. 4A to 4G are diagrams showing examples of linear structural elements in directions other than the scanning direction. FIG. 5 is a diagram showing an example of a linear structural element in the scanning direction. FIG. 5 is illustrated for reference and is not used in the opening process (step S22) of the first embodiment.

The linear structural element denotes a spatial filter of a structural element corresponding to a linear structure of the image. It is only necessary that the linear structural element indicates a substantially linear structure in a pixel range of a set filter size. FIGS. 4A, 4C, 4E, and 4G are also thought of as linear structures in a range of resolving power of pixel. The direction other than the scanning direction denotes a direction not parallel to the scanning direction. A linear structural element in a direction other than the scanning direction will be called a "non-scanning direction linear structural element".

FIGS. 4A to 4G show seven types of non-scanning direction linear structural elements. In the execution of the invention, at least one non-scanning direction linear structural element is set. Therefore, the number of non-scanning direction linear structural elements can be an arbitrary number equal to or greater than one. It is preferable to set a plurality of non-scanning direction linear structural elements to increase the accuracy of the inspection. The filter size of the structural element is not limited to the size of 11×11 pixels illustrated in the drawings. The filter size of the structural element can be an arbitrary size equal to or greater than 3×3 pixels.

At least one non-scanning direction linear structural element as shown in FIGS. 4A to 4G is used to carry out the opening process of a grayscale image (step S22) that is one of the morphology processing. The grayscale image denotes a multi-valued continuous tone image and is, for example, an 8-bit image expressed by 256 tones. Obviously, the tone of the grayscale image is not limited to 8 bits, and the tone may be 14 bits or the like.

When a linear structural element in a specific direction is used to carry out the opening process, the image is smoothed in a state that the linear structure in the specific direction is saved. The opening process is a process with a combination of a process of expansion (dilation) and a process of contraction (erosion).

The opening process based on a structural element g of an image signal f is defined by the following Formula 1. Formula 1 is expressed in one dimension to simplify the description.

$$f_g = \text{dilation}(\text{erosion}(f, g^s), g) \quad \text{Formula 1}$$

$$\text{dilation}(f, g^s) = \max_{\substack{x+u \in F \\ u \in G}} \{f(x+u) + g(u)\}$$

$$\text{erosion}(f, g^s) = \min_{\substack{x+u \in F \\ u \in G}} \{f(x+u) - g(u)\}$$

F in Formula 1 is a domain of the signal f. G is a domain of the structural element g. Reference character $g^S$ denotes a symmetrical set of g, and $g^S$ is defined as inversion of left, right, up, and down of g.

The opening process is carried out for each of the preset at least one non-scanning direction linear structural element. In the examples of FIGS. 4A to 4G, seven types of non-scanning direction linear structural elements are defined, and the opening process is carried out based on each of the seven types of non-scanning direction linear structural elements. An image after opening process is obtained from each opening process, and seven types of images after opening process are obtained in total.

Next, the maximum value image creation process (step S24 of FIG. 3) is executed. In the maximum value image creation process (step S24), the image group after opening process is compared in each pixel, and a maximum value image is created by adopting a maximum value of each pixel position. The maximum value image creation process (step S24) is expressed by Formula 2.

$$\bar{f}_g(x, y) = \max_{i=1,2,\wedge M} f_{gi}(x, y) \quad \text{Formula 2}$$

M in Formula 2 is an integer indicating the number of structural elements. Reference character i denotes an index for distinguishing the structural elements. In the maximum value image created in the maximum value image creation process (step S24), the linear structures in the scanning direction are smoothed, and the other linear structures are not smoothed.

The maximum value image created in the maximum value image creation process (step S24) is equivalent to a "first smoothed inspection image". A step of the morphology processing with a combination of the opening process (step S22) and the maximum value image creation process (step S24) is equivalent to a mode of a "first smoothed inspection image creation step".

Next, the process proceeds to the difference processing (step S26). In the difference processing (step S26), the maximum value image created in step S14 is subtracted from the original inspection image to create a difference image. The process of subtracting the maximum value image from the original inspection image to obtain the difference image is called top-hat conversion. The difference processing (step S26) can be called a top-hat conversion process.

The difference processing (step S26), that is, the top-hat conversion process, is expressed by Formula 3.

$$\Delta f_g(x,y) = f(x,y) - \bar{f}_g(x,y) \quad \text{Formula 3}$$

As a result of the difference processing (step S26), the maximum value image in which only the linear structures in the scanning direction are smoothed is subtracted from the original inspection image, and linear components extending in the scanning direction, such as a stripe defect, can be extracted.

[Isolated Points in Inspection Image]

In the image inspection process of the present embodiment, points that are isolated (hereinafter, called isolated points) not extending in any direction are also extracted other than the linear components extending in the scanning direction. Since a stripe defect includes isolated points with a row of intermittent stripes in the scanning direction in some cases, the isolated points are left in the present process. A spot-like defect in JP2001-297321A corresponds to the isolated points.

[Specific Example of Processing Result]

Figure 6:
FIG. 6 is a diagram showing a specific example of an inspection image.

FIG. 6 shows a specific example of the inspection image. The vertical direction of FIG. 6 is the Y direction and is equivalent to the "scanning direction". Numerals provided on the horizontal axis of FIG. 6 indicate numbers of the pixels in the X direction. Numerals provided on the vertical axis of FIG. 6 indicate numbers of the pixels in the Y direction. FIG. 6 shows an example in which there is a stripe defect extending in the vertical direction at a position to the right of the center of the inspection image (near pixel number 600 in the X direction).

Figure 7:
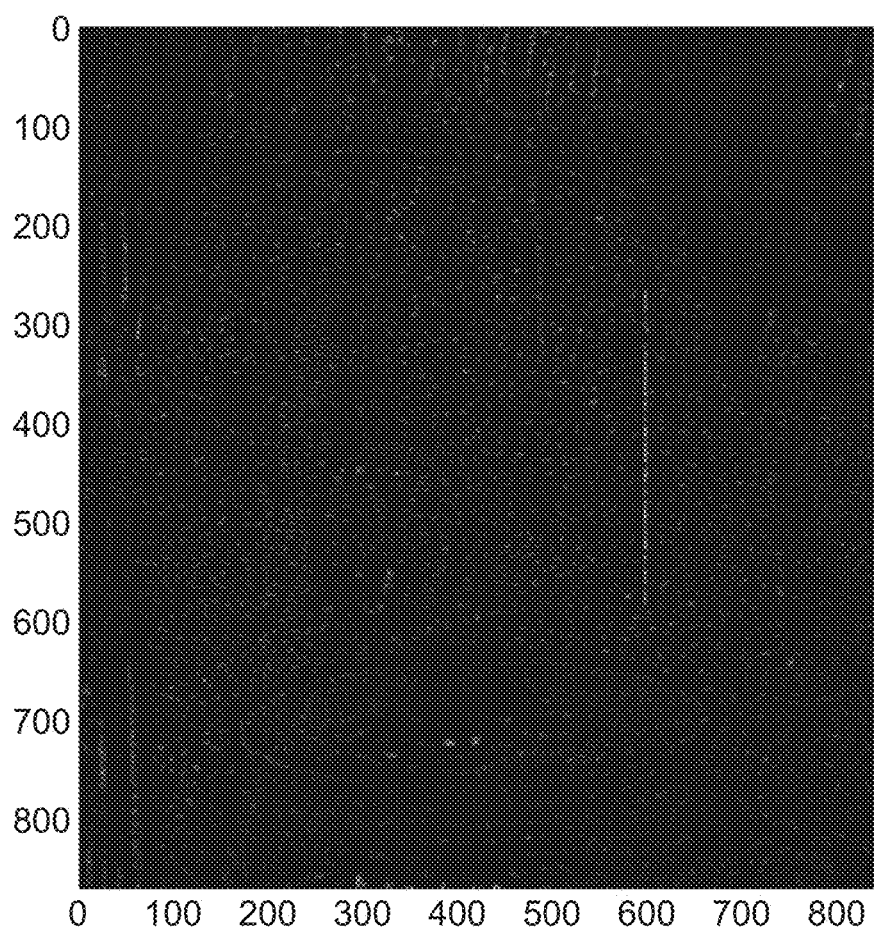
FIG. 7 is a diagram showing an example of an image of a processing result obtained by applying the stripe information extraction process to the inspection image.

FIG. 7 shows an image of the processing result obtained by applying the stripe information extraction process described in FIG. 3 to the inspection image shown in FIG. 6. FIG. 7 is an example of the difference image described in Formula 3.

As shown in FIG. 7, a difference image is obtained in which the stripe defect extending in the vertical direction is clearly recognized as a bright section. In FIG. 7, most of the contour lines of the image included in the picture of the printed image are dark sections.

Figures 8, 9:
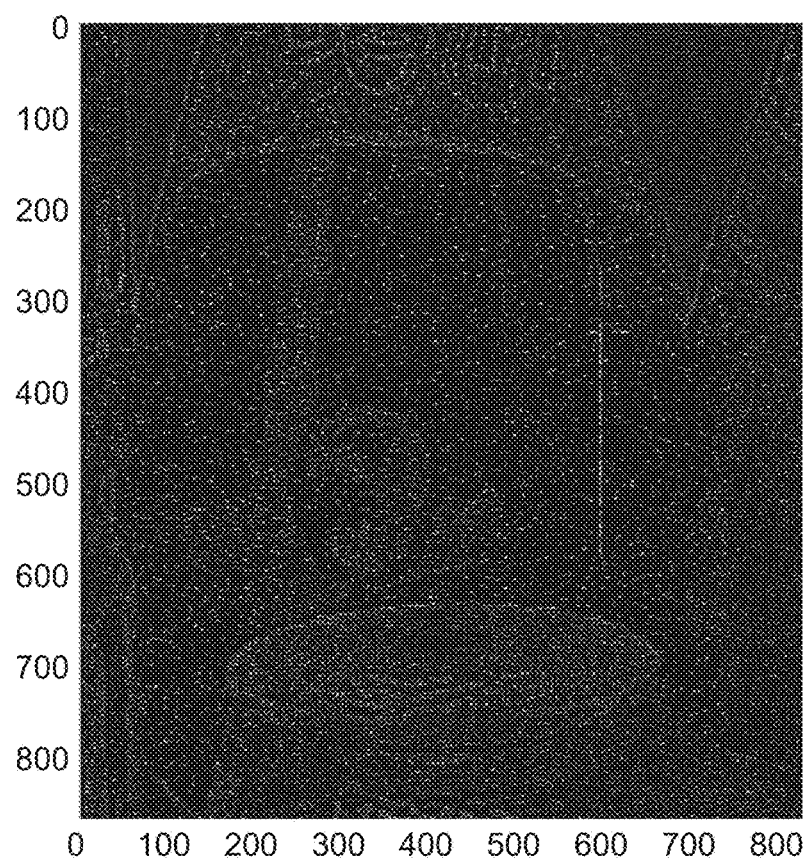
FIG. 8 is a diagram showing a comparative example and is a diagram showing an image in which a Laplacian filter is used to apply edge enhancement to the inspection image of FIG. 6.
FIG. 9 is a diagram showing an example of the Laplacian filter used in the process of edge enhancement.

FIG. 8 shows a comparative example. FIG. 8 is an image in which a Laplacian filter is used to apply edge enhancement to the inspection image shown in FIG. 6. FIG. 9 is the Laplacian filter used in the process of the edge enhancement. In FIG. 8, information of the stripe defect is degraded compared to FIG. 7. Furthermore, contour lines of the image also appear as bright sections in FIG. 8, and the contour lines of the image can be noise components.

[Determination Method of Stripe Defect]

When the difference image as in FIG. 7 is obtained, the process proceeds to the stripe defect detection step described in step S14 of FIG. 2. There can be various methods of using the difference image shown in FIG. 7 to detect the stripe defect. The following method will be introduced here as an example. Specifically, a plurality of blocks serving as target areas of arithmetic processing are set for the difference image shown in FIG. 7, and pixel values of the image are integrated or averaged in the vertical direction (scanning direction) in each block to obtain a one-dimensional profile. It is determined that there is a stripe defect when the signal value exceeds a preset threshold on the one-dimensional profile.

In the stripe defect detection step (step S14 of FIG. 2), a stripe defect detection process of determining whether there is a stripe defect is executed by, for example, creating the one-dimensional profile from the difference image as described above. Although FIG. 7 includes isolated points not contributing to the stripe defect, the signal value of a small isolated point signal is weakened at the stage of integrating the pixel values in the vertical direction, and the isolated points are unlikely to be erroneously determined as a stripe.

In the extraction result of the stripe information shown in FIG. 7, the stripe information is sufficiently clearly extracted compared to FIG. 8, and highly accurate detection of the stripe defect is possible.

Second Embodiment

When the picture of the printed image includes linear structural components extending in the scanning direction in the method described in the first embodiment, the linear structural components of the picture may be extracted as a "stripe", and this may cause a false detection.

In the example shown in FIG. 7, it can be recognized that a character image and a pattern written on a can on the left side of the image include linear structural components extending in the scanning direction, and scanning direction linear structural components are extracted in FIG. 7.

Therefore, a process of using a reference image to remove the scanning direction linear structural components included in the reference image from the stripe information is added in the second embodiment to further improve the detection accuracy.

Specifically, a series of morphology processing similar to the process described in FIG. 3 is also applied to the reference image, and extracted components are removed as noise from the components of FIG. 7.

An image after noise removal s(x,y) can be acquired by, for example, operation of the following Formula 4, wherein the reference image is r(x,y), and a maximum value image obtained by applying the morphology processing to the reference image is $r_g(x,y)$ with an overline over the character r (fourth term on the right-hand side in Formula 4 is the maximum value image).

$$s_g(x,y)=(f(x,y)-\bar{f}_g(x,y))-(r(x,y)-\bar{r}_g(x,y))$$  Formula 4

The maximum value image obtained by applying the morphology processing to the reference image is equivalent to a mode of a "first smoothed reference image". The step of creating the first smoothed reference image from the reference image can be understood as a first smoothed reference image creation step.

Figure 10:
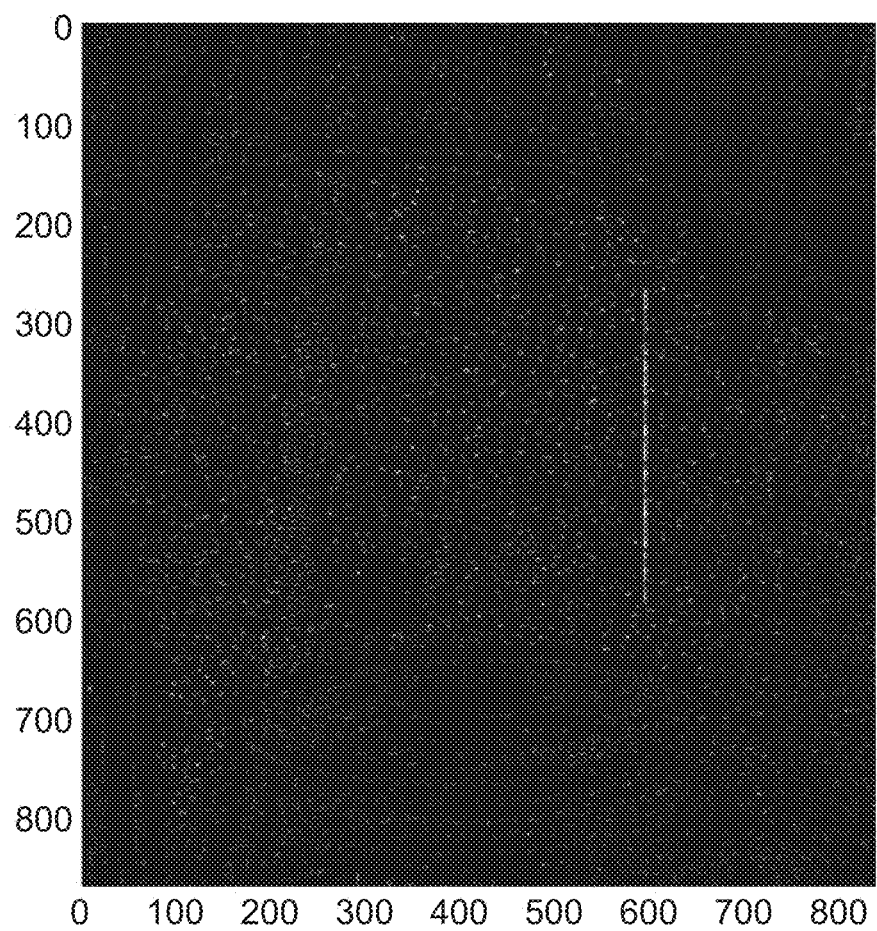
FIG. 10 is a diagram showing an example of an image from which noise as components extracted from the reference image is removed.

FIG. 10 shows an example of an image from which noise as components extracted from the reference image is removed. As can be recognized by comparison with FIG. 7, the scanning direction linear structural components included in the reference image are removed in FIG. 10. The stripe defect can be more accurately detected by using the image after noise removal as in FIG. 10. In the example of FIG. 10, negative components of the image after noise removal are clipped at zero.

Figure 11:
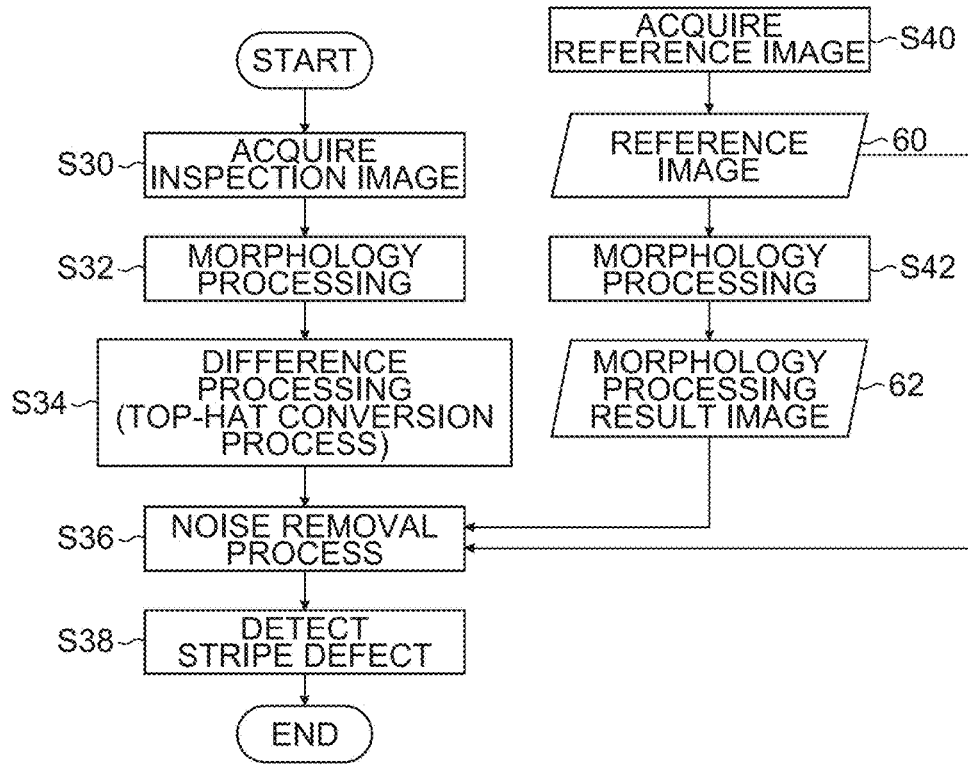
FIG. 11 is a flow chart of an image inspection method according to a second embodiment.

FIG. 11 is a flow chart of an image inspection method according to the second embodiment. In an image inspection process shown in FIG. 11, morphology processing (step S32), difference processing (step S34), and a noise removal process (step S36) are applied to an inspection image acquired in an inspection image acquisition step (step S30), and a stripe defect is detected based on an image after noise removal (step S38). The inspection image acquisition step (step S30) is equivalent to step S10 described in FIG. 2.

Details of the morphology processing (step S32) of FIG. 11 are similar to the details of steps S22 and S24 described in FIG. 3. Details of the difference processing (step S34) of FIG. 11 are similar to the details of step S26 described in FIG. 3.

The noise removal process (step S36) of FIG. 11 is a process of removing the scanning direction linear structural components included in the reference image from the difference image obtained in the difference processing (step S34). The noise removal process (step S36) is equivalent to the process described in Formula 4. In the execution of the noise removal process (step S36), a reference image 60 is prepared in advance, and the morphology processing (step S42) described in steps S22 and S24 of FIG. 3 is applied to the reference image 60 to create a morphology processing result image 62.

The flow chart of FIG. 11 shows a flow of applying the morphology processing (step S42) to the reference image 60 acquired in the reference image acquisition step (step S40) to obtain the morphology processing result image 62 that is image data of the processing result.

The reference image 60 can be created based on, for example, image data for printing that is input to the ink jet printing apparatus. The input image data may be used as the reference image 60, or some image processing (process including one or a combination of various basic image processing, such as resolution conversion, gamma conversion, color conversion, geometric conversion, and spatial filtering) may be applied to the input image data to facilitate the comparison with the inspection image. The input image data may be data before a halftone process or may be data after the halftone process. A reference read image obtained by reading an excellent printed image without generation of a stripe defect in an actual printed matter can also be used as the reference image 60. The process of creating the reference image based on the input image data and the process of reading the printed matter without a stripe defect to create the reference read image can be thought of as a reference image creation process.

It may be understood that the reference image is created in the reference image creation process to acquire the reference image in the reference image acquisition step (step S40), or it may be understood that data of the reference image created in the reference image creation process is acquired through a wired or wireless signal transmitting device or a portable storage medium.

Details of the morphology processing (step S42) are similar to the details of steps S22 and S24 of FIG. 3. The morphology processing result image 62 is equivalent to the "first smoothed reference image".

In the noise removal process (step S36), the reference image 60 and the morphology processing result image 62 are used to remove the noise from the difference image as described in Formula 4.

In the stripe defect detection step (step S38), the stripe defect is detected from the image after noise removal obtained in the noise removal process (step S36). Details of the stripe defect detection step (step S38) are similar to the details of step S14 of FIG. 2.

Although the reference image 60 and the morphology processing result image 62 of the reference image 60 are provided in the noise removal process (step S36) of FIG. 11, the morphology processing result image 62 may be subtracted from the original reference image 60 to provide a difference image as indicated by Formula 4. In this case, the difference processing (top-hat conversion process) is executed as in step S26 of FIG. 3 after the morphology processing (step S42), and a reference difference image that is a difference image is created. The reference difference image can be prepared in advance and utilized in the noise removal process (step S36).

According to the second embodiment, the stripe defect can be more accurately detected compared to the first embodiment.

Modified Example of Second Embodiment

For a modified example of the second embodiment, a first difference image can be created that is a difference image between the inspection image and the reference image, and a second difference image can be created that is a difference image between the first smoothed inspection image created in the morphology processing (step S32) for the inspection image and the first smoothed reference image created in the morphology processing (step S42) for the reference image. An image after noise removal process equivalent to FIG. 10 can be obtained from the difference between the first difference image and the second difference image. Therefore, the inspection image, the first smoothed inspection image, the reference image, and the first smoothed reference image can be used to obtain the image after noise removal process.

The noise removal process using the reference image described in the second embodiment is useful in increasing the accuracy of the extraction of the stripe information. However, the noise removal process may not be necessary in some cases. For example, there is a utility mode in the line-head ink jet printing apparatus, in which a "screen tint image" is printed for nozzle inspection for examining the state of the nozzles of the line head to check that the stripe is not generated. In this case, it is recognized in advance that the "screen tint image" that is a reference image does not include linear structural components extending in the scanning direction. Therefore, the noise removal process as described in the second embodiment is not necessary in such a case.

[The Number of Non-Scanning Direction Linear Structural Elements]

Although seven linear structural elements are illustrated in total in the example of FIGS. 4A to 4G, linear structural elements with more detailed angles relative to the scanning direction may be added. The increase in the number of linear structural elements increases the calculation time, but the extraction accuracy of the stripe information improves. Obviously, the number of linear structural elements may be reduced to a number smaller than seven. In this case, the extraction accuracy is reduced, but the calculation time decreases. The calculation time is reflected on the processing time required for the process of detection.

The number of non-scanning direction linear structural elements used for the morphology processing is set to an appropriate number according to conditions of at least one of the required accuracy of detection and the processing time required for the process of detection. It is preferable to be able to adaptively increase and decrease the number of non-scanning direction linear structural elements used for the morphology processing according to required conditions.

[Filter Size of Structural Elements]

Although the filter size of each structural element is 11×11 pixels in the example illustrated in FIGS. 4A to 4G and 5, the filter size can be changed. It is preferable to appropriately adjust the filter size according to the thickness of the stripe defect to be detected and the resolution of the imaging device. The filter size of each structural element may not be the same. It is desirable that the filter size of the structural element is sufficiently long with respect to the thickness of the stripe.

[Definition of Linear Structural Elements in Scanning Direction]

In the description above, FIGS. 4A to 4G illustrate the linear structural elements in directions other than the scanning direction, and FIG. 5 illustrates the linear structural element in the scanning direction. An inspection image with a tilted stripe defect is acquired in some cases depending on the state of image reading by the imaging device. Therefore, for example, the linear structural elements in directions close to the scanning direction as in FIGS. 4A to 4G may be assumed as "linear structural elements in the scanning direction", and the linear structural elements may be excluded from the opening process to prevent removing the tilted stripe defect. Specifically, a linear structural element in a direction not parallel to the scanning direction and in which the angle relative to the scanning direction is smaller than a preset prescribed angle is assumed as a "linear structural element in the scanning direction" and is excluded from the non-scanning direction linear structural elements. The preset prescribed angle is a value for prescribing a range of angle to be handled as a direction close to the scanning direction.

The handling allows detection of a tilted stripe defect. However, there is a drawback that the noise components tend to remain.

[Relationship between Opening Process and Closing Process]

Although the opening process (step S22) is described in the first and second embodiments, representative morphological operation also includes a "closing process". The closing process is defined by the following Formula 5.

$$f_g = \text{erosion}(\text{dilation}(f, g^S), g) \qquad \text{Formula 5}$$

When the closing process is executed by reversing black and white of the signal f of the image, and black and white of the obtained result is reversed one more time, this coincides with the result of the opening process of the signal f. Specifically, when the range of the signal f is [0–1], the reversal of black and white is equivalent to performing operation of (1−f), and the following Formula 6 is established.

$$\text{dilation}(\text{erosion}(f, g^S), g) = 1 - \text{erosion}(\text{dilation}(1-f, g^S), g) \qquad \text{Formula 6}$$

Therefore, the process described in the first and second embodiments is not limited to the process using the opening process, and the relationship of Formula 6 may be utilized to use the closing process.

[When Defect to Be Detected Is Black Stripe]

In the description of the first and second embodiments, the method is mainly suitable for detecting a white stripe, that is, a stripe with a large signal value in the inspection image compared to the non-defect section. To detect a black stripe, that is, a stripe with a small signal value compared to the non-defect section, [1] the closing process can be used in place of the opening process, and [2] a minimum value image can be created in place of the maximum value image.

An example of a cause of the black stripe includes execution of some compensation processing for the white stripe (for example, process of disabling ejection by a poor nozzle and increasing the amount of ejection of a neighborhood nozzle to make the white stripe hard to see), and the black stripe may be generated depending on the accuracy of the compensation processing. For example, a black stripe may be generated when the amount of ejection by the nozzle near the disabled poor nozzle is increased too much. Obviously, a white stripe may be generated depending on the accuracy of the compensation processing. For example, a white stripe may be generated when the amount of increase in the amount of ejection by the nozzle near the disabled poor nozzle is insufficient.

Third Embodiment

Figure 12:
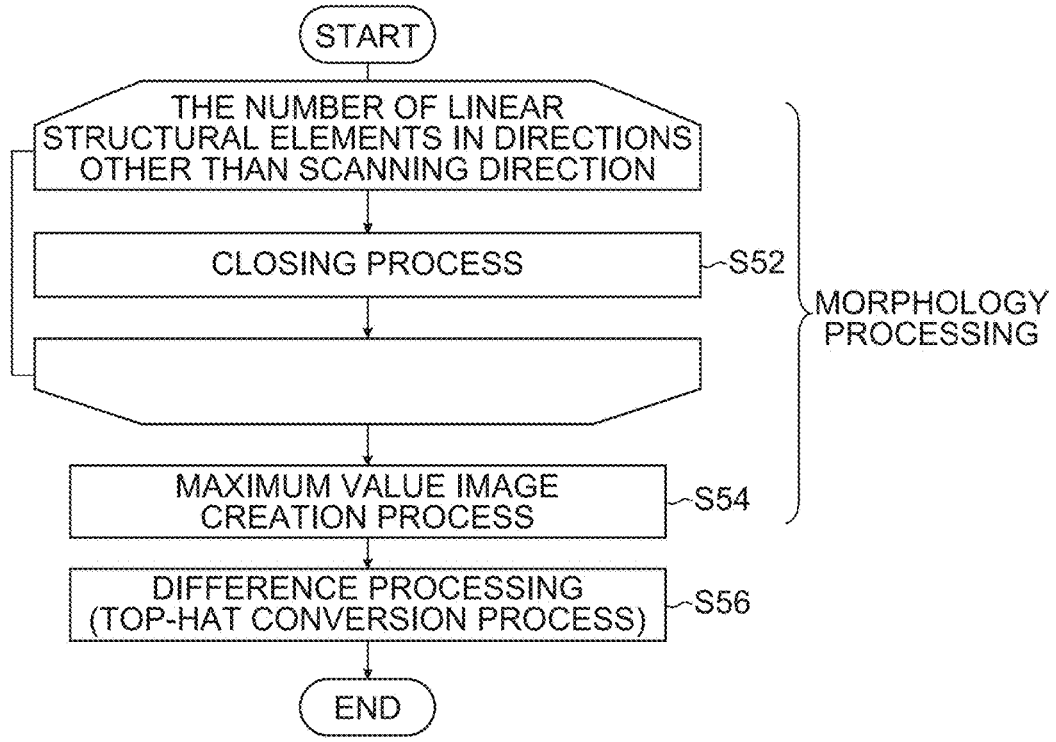
FIG. 12 is a flow chart for detecting a black stripe according to a third embodiment.

FIG. 12 is a flow chart showing details of a stripe information extraction process in detecting a black stripe. To detect a black stripe, the flow chart of FIG. 12 is applied in place of the flow chart of FIG. 3. The stripe information extraction process shown in FIG. 12 includes a closing process based on linear structural elements in directions other than the scanning direction (step S52), a minimum value image creation process (step S54), and difference processing (step S56). In a third embodiment, the process from the closing process (step S52) to the minimum value image creation process (step S54) will be called morphology processing.

First, the closing process (step S52) based on the liner structural elements in directions other than the scanning direction is applied to the acquired inspection image.

The non-scanning direction linear structural elements illustrated in FIGS. 4A to 4G can be used for the linear structural elements used in the closing process (step S52), as in the opening process (step S22) described in FIG. 3.

Images after closing process can be obtained from the closing process using each of the non-scanning direction linear structural elements.

Next, the minimum value image creation process (step S54 of FIG. 12) is executed. In the minimum value image creation process (step S54), the image group after closing process is compared in each pixel, and a minimum value of each pixel position is adopted to create a minimum value image. The minimum value image obtained in step S54 based on the inspection image is equivalent to a mode of the "first smoothed inspection image".

In the difference processing (step S56), the minimum value image created in step S54 is subtracted from the original inspection image to create a difference image. The difference processing (step S56) is a process similar to step S26 of FIG. 3. The stripe information of the black stripe can be extracted based on the flow chart shown in FIG. 12.

In the detection of the black stripe, the closing process can be replaced by the opening process with the black and white reversing process, as in the details already described in Formulas 5 and 6.

In the flow chart described in FIG. 11, the morphology processing described in the flow chart of FIG. 12 can be applied to the part of the morphology processing.

[To Delete Isolated Points]

In the first to third embodiments, the isolated points are left in the extraction of the stripe information in the inspection image to prevent missing intermitted stripes with a row of isolated points in the scanning direction. However, the isolated points may be removed when it is guaranteed in advance that the intermittent stripes will not be generated.

Fourth Embodiment

An example of the method of removing the isolated points includes the following method. First, each element of a linear structural element group in all directions including the scanning direction is used to carry out the morphology processing. The linear structural element group in all directions denotes, for example, a set of linear structural elements in FIGS. 4A to 4G and 5. The "all directions" is just a convenient expression including at least one direction other than the scanning direction and the scanning direction. The morphology processing is one of the "combination of the opening process and the maximum value image creation process" and the "combination of the closing process and the minimum value image creation process". A case in which the morphology processing is the "combination of the opening process and the maximum value image creation process" will be described here.

A morphology processing result image after morphology processing using each of the linear structural elements in all directions will be called a second smoothed inspection image. The image after difference processing (top-hat conversion process) is expressed by the following Formula 7, wherein the second smoothed inspection image is $f_h(x,y)$ with an overline over the character f (second term on the right-hand side in Formula 7).

$$\Delta f_h(x,y) = f(x,y) - \overline{f}_h(x,y) \qquad \text{Formula 7}$$

Figure 13:
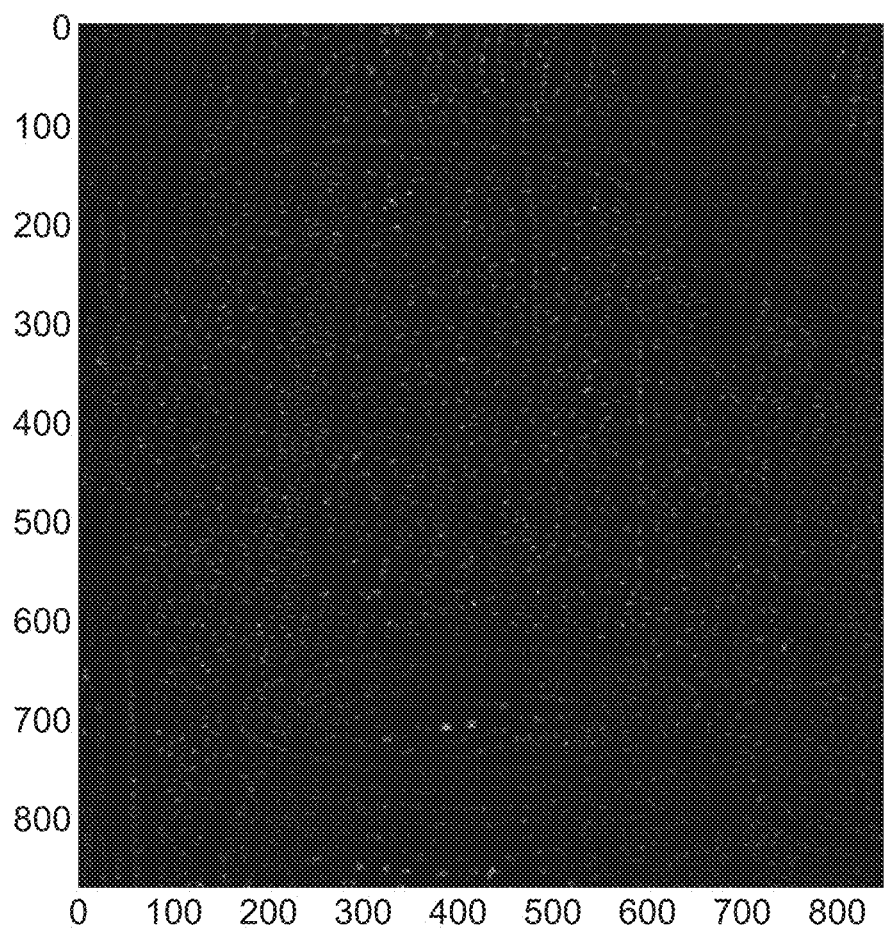
FIG. 13 is a diagram showing an example of an image after top-hat conversion process created for removing isolated points according to a fourth embodiment.

FIG. 13 shows an example of the image after top-hat conversion process obtained by the top-hat conversion process illustrated in Formula 7 based on the inspection image of FIG. 6. The image after top-hat conversion process illustrated in Formula 7 is an image in which only the isolated points are left as shown in FIG. 13.

The second smoothed inspection image (equivalent to the second term on the right-hand side of Formula 7) can be used to remove the isolated point components of the result image of the stripe information extraction process described in the first embodiment.

The relationship illustrated in Formula 8 is established, wherein $\Delta f_{gh}(x,y)$ is an image after isolated point removal.

$$\Delta f_{gh}(x, y) \quad \text{Formula 8}$$
$$= \Delta f_g(x, y) - \Delta f_h(x, y)$$
$$= f(x, y) - \overline{f}_g(x, y) - (f(x, y) - \overline{f}_h(x, y))$$
$$= \overline{f}_h(x, y) - \overline{f}_g(x, y)$$

As is apparent from Formula 8, the image after isolated point removal $\Delta f_{gh}(x,y)$ can be created only from the maximum value image (equivalent to the first smoothed inspection image) illustrated in Formula 2 and the second smoothed inspection image.

Figure 14:
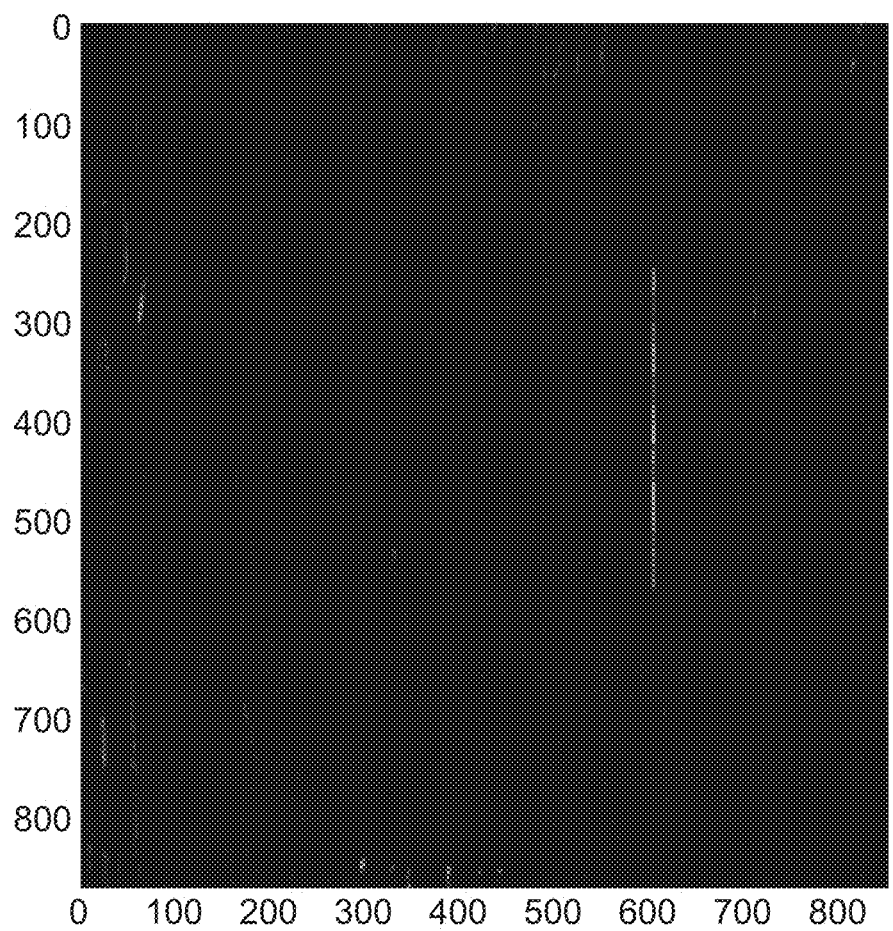
FIG. 14 is a diagram showing an example of an image after isolated point removal created based on the inspection image of FIG. 6.

FIG. 14 shows an example of the image after isolated point removal $\Delta f_{gh}(x,y)$ created based on the inspection image of FIG. 6. Compared to FIG. 7, it can be recognized that the isolated points are removed in FIG. 14.

Figure 15:
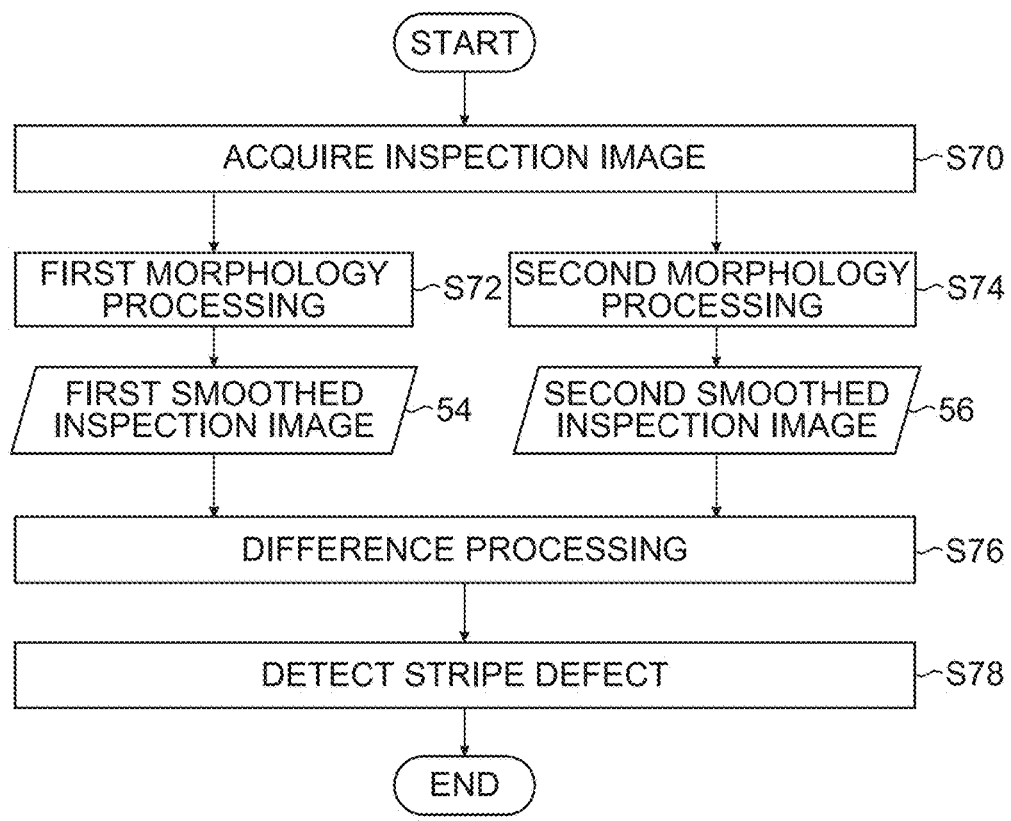
FIG. 15 is a flow chart showing details of a process of an image inspection method according to the fourth embodiment.

FIG. 15 is a flow chart showing details of the process of the image inspection method according to the fourth embodiment for removing the isolated points.

An image inspection process shown in FIG. 15 includes each step of an inspection image acquisition step (step S70), first morphology processing (step S72), second morphology processing (step S74), difference processing (step S76), and a stripe defect detection step (step S78). The inspection image acquisition step (step S70) is equivalent to step S10 described in FIG. 2.

The first morphology processing (step S72) is equivalent to the morphology processing described in FIG. 3. The first morphology processing (step S72) is morphology processing using each of at least one preset non-scanning direction linear structural element as illustrated in FIGS. 4A to 4G. The first smoothed inspection image 54 is created by the first morphology processing (step S72). The step of the first morphology processing (step S72) is equivalent to a mode of the "first smoothed inspection image creation step".

The second morphology processing (step S74) is morphology processing using each element of a linear structural element group including the linear structural element in the scanning direction in addition to the non-scanning direction linear structural element group used in the first morphology processing (step S72). The linear structural element group including the linear structural element in the scanning direction in addition to the at least one non-scanning direction linear structural element group will be simply written as a "linear structural element group in all directions". A second smoothed inspection image 56 is created by the second morphology processing (step S74) using each of the linear structural elements in all directions. The step of the second morphology processing (step S74) is equivalent to a mode of a "second smoothed inspection image creation step".

Although the first morphology processing (step S72) and the second morphology processing (step S74) are described in parallel in FIG. 15, the processes may be sequentially carried out, and the order of processing does not matter. Since the opening process (or the closing process) of each element of the non-scanning direction linear structural element group in the second morphology processing (step S74) is also calculated in the first morphology processing (step S72), the results may be applied without performing the calculation again.

The difference processing (step S76) is a process of subtracting the first smoothed inspection image 54 from the second smoothed inspection image 56 to create a difference image. The difference image created by the difference processing (step S76) is equivalent to the image after isolated point removal described in Formula 8. The difference image created by the difference processing (step S76) will be called an "image after isolated point removal".

In the stripe defect detection step (step S78), the stripe defect is detected from the image after isolated point removal that is the difference image obtained by the difference processing (step S76). Details of the specific method of the detection process in the stripe defect detection step (step S78) are similar to the details of step S14 of FIG. 2.

Fifth Embodiment

The process up to the isolated point removal as in the fourth embodiment can also be applied to the reference image 60 described in the second embodiment to remove the linear structural components (noise components) in the scanning direction included in the reference image from the inspection image as described in the second embodiment.

An image after noise component removal $S_{gh}(x,y)$ can be expressed as in Formula 9, wherein the image (equivalent to the "second smoothed reference image") obtained by applying the morphology processing to the reference image r(x,y) by using the linear structural element group in all directions is $r_h(x,y)$ with an overline over the character r (third term on the right-hand side of Formula 9).

$$s_{gh}(x,y)=(\overline{f}_h(x,y)-\overline{f}_g(x,y))-(\overline{r}_h(x,y)-\overline{r}_g(x,y)) \quad \text{Formula 9}$$

Figure 16:
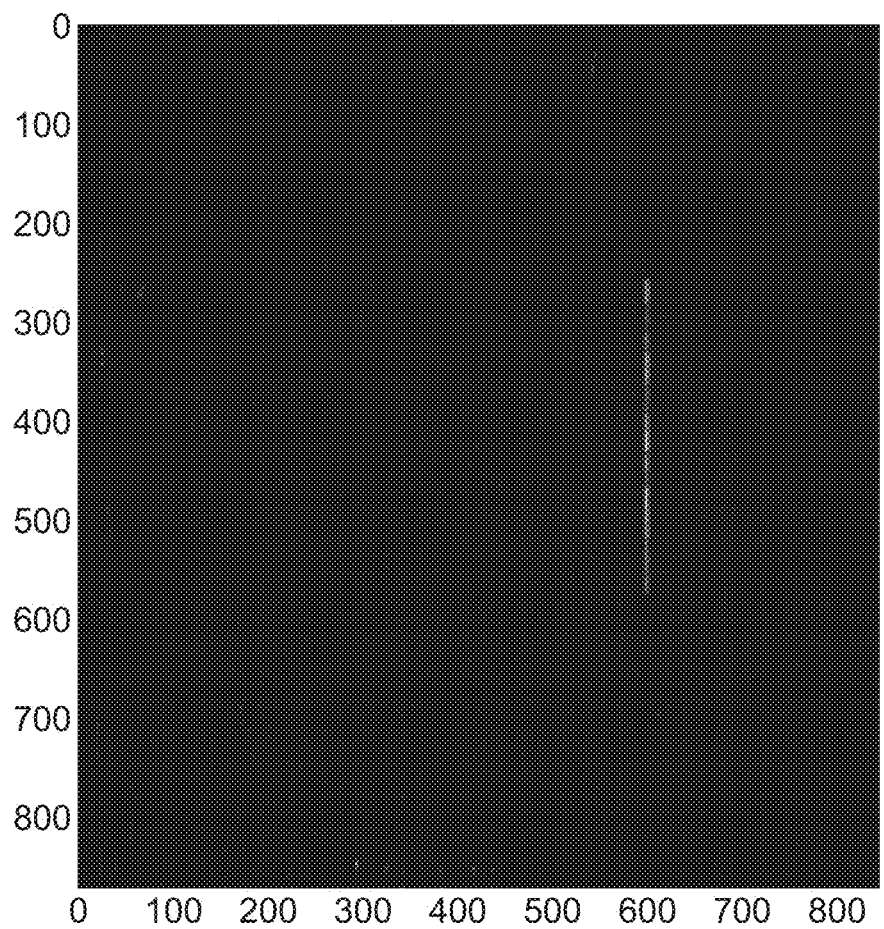
FIG. 16 is a diagram showing an example of an image created by removing the isolated points and removing the noise components from the inspection image of FIG. 6.

FIG. 16 is an example of the image after noise component removal $S_{gh}(x,y)$.

Compared to FIG. 14, it can be recognized that the contour components of the image are removed in FIG. 16.

Figure 17:
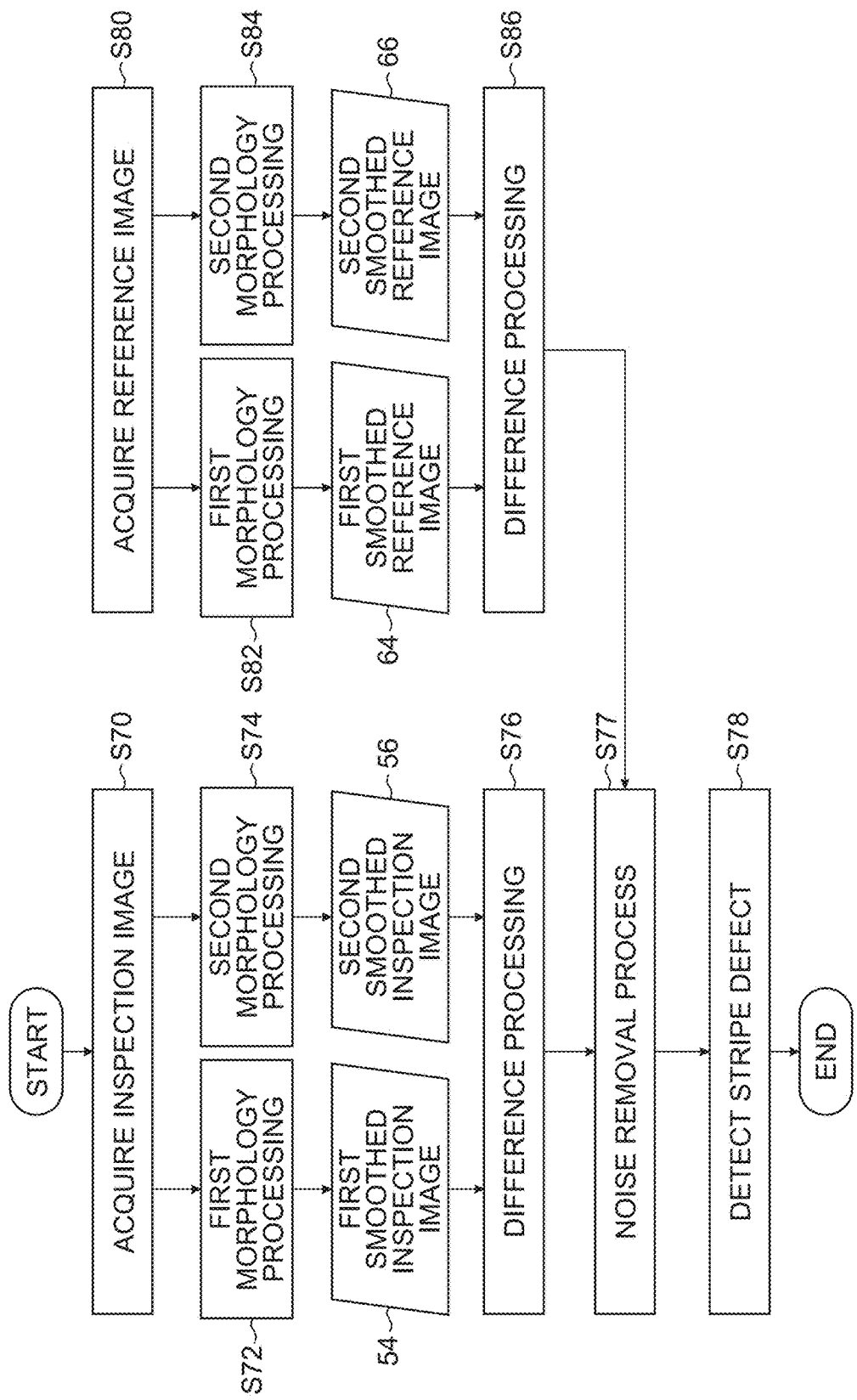
FIG. 17 is a flow chart showing details of a process of an image inspection processing method according to a fifth embodiment.

FIG. 17 is a flow chart showing details of a process of an image inspection processing method according to a fifth embodiment. In FIG. 17, the same step numbers are provided to the same or similar steps as in the process described in FIG. 15, and the description will not be repeated.

An image inspection process illustrated in FIG. 17 includes each step of a reference image acquisition step (step S80), first morphology processing applied to the reference image (step S82), second morphology processing (step S84), and difference processing (step S86).

The reference image acquisition step (step S80) is equivalent to step S40 of FIG. 11. Details of the process of the first morphology processing (step S82) applied to the reference image are similar to the first morphology processing (step S72) applied to the inspection image. The first morphology processing (step S82) is applied to the reference image to create a first smoothed reference image 64. The first smoothed reference image 64 is equivalent to the morphology processing result image 62 described in FIG. 11.

Details of the process of the second morphology processing (step S84) applied to the reference image are similar to the second morphology processing (step S74) applied to the inspection image. The second morphology processing (step S84) is applied to the reference image to create a second smoothed reference image 66. The step of the second morphology processing (step S84) can be thought of as a second smoothed reference image creation step.

The difference processing (step S86) is a process of subtracting the first smoothed reference image 64 from the second smoothed reference image 66 to create a difference image. As a result of the difference processing (step S86), the difference image is an image from which the isolated points are removed. The difference image created in the difference processing (step S86) will be called a "reference difference image after isolated point removal".

In the noise removal process (step S77), the reference difference image after isolated point removal created in the difference processing of step S86 is subtracted from the image after isolated point removal created in the difference processing of step S76 to create an image from which the scanning direction linear structural components included in the reference image are removed as noise components. In the noise removal process (step S77), the image after noise component removal described in Formula 9 is created. The image after noise component removal created in the noise removal process (step S77) will be called an "image after noise removal".

As is apparent from Formula 9, the image after noise removal can be created by using the first smoothed inspection image 54, the second smoothed inspection image 56, the first smoothed reference image 64, and the second smoothed reference image 66. Therefore, a mode without the difference processing illustrated in steps S76 and S86 of FIG. 17 is also possible. Specifically, in the step of the noise removal process (step S77), the first smoothed inspection image 54, the second smoothed inspection image 56, the first smoothed reference image 64, and the second smoothed reference image 66 can be imported, and the image after noise removal can be created according to Formula 9 based on the images. The operation of the noise removal process (step S77) in this case substantially includes the difference processing of step S76 and the difference processing of step S86.

In the stripe defect detection step (step S78), the stripe defect is detected from the image after noise removal obtained in the noise removal process (step S77). Details of the specific method of the detection process in the stripe defect detection step (step S78) are similar to the details of step S14 of FIG. 2.

[Preprocessing of Inspection Image and Reference Image]

Some processing, that is, preprocessing, may be applied to each of the inspection image and the reference image before the execution of the morphology processing in each embodiment of the first to fifth embodiments. For example, one or a plurality of various image processing may be executed as the preprocessing, such as (1) some image processing for facilitating the comparison of the inspection image and the reference image (various image processing such as resolution conversion, gamma conversion, color conversion, geometric conversion, spatial filtering, and positioning between the inspection image and the reference image), (2) process of using a visual characteristic filter (VTF: Visual Transfer Function) or the like in advance for smoothing, and (3) a process of removing a noise generation factor in advance based on morphology processing different from the morphology processing applied in each embodiment.

The preprocessing for the inspection image will be called first preprocessing, and the preprocessing for the reference image will be called second preprocessing. The first preprocessing step for the inspection image is carried out after the inspection image acquisition step (step S10) and before the stripe information extraction step (step S12) illustrated in FIG. 2. The second preprocessing step for the reference image is carried out after the reference image acquisition step (step S40) and before the morphology processing step of step S42 described in FIG. 11.

The first preprocessing step for the inspection image in each embodiment illustrated in FIGS. 15 and 17 is carried out after the inspection image acquisition step (step S70), before the first morphology processing step of step S72, and before the second morphology processing step of step S74.

The second preprocessing step for the reference image in the embodiment illustrated in FIG. 17 is carried out after the reference image acquisition step (step S80), before the first morphology processing step of step S82, and before the second morphology processing step of step S84.

Configuration of Image Inspection Apparatus according to First Embodiment

Figure 18:
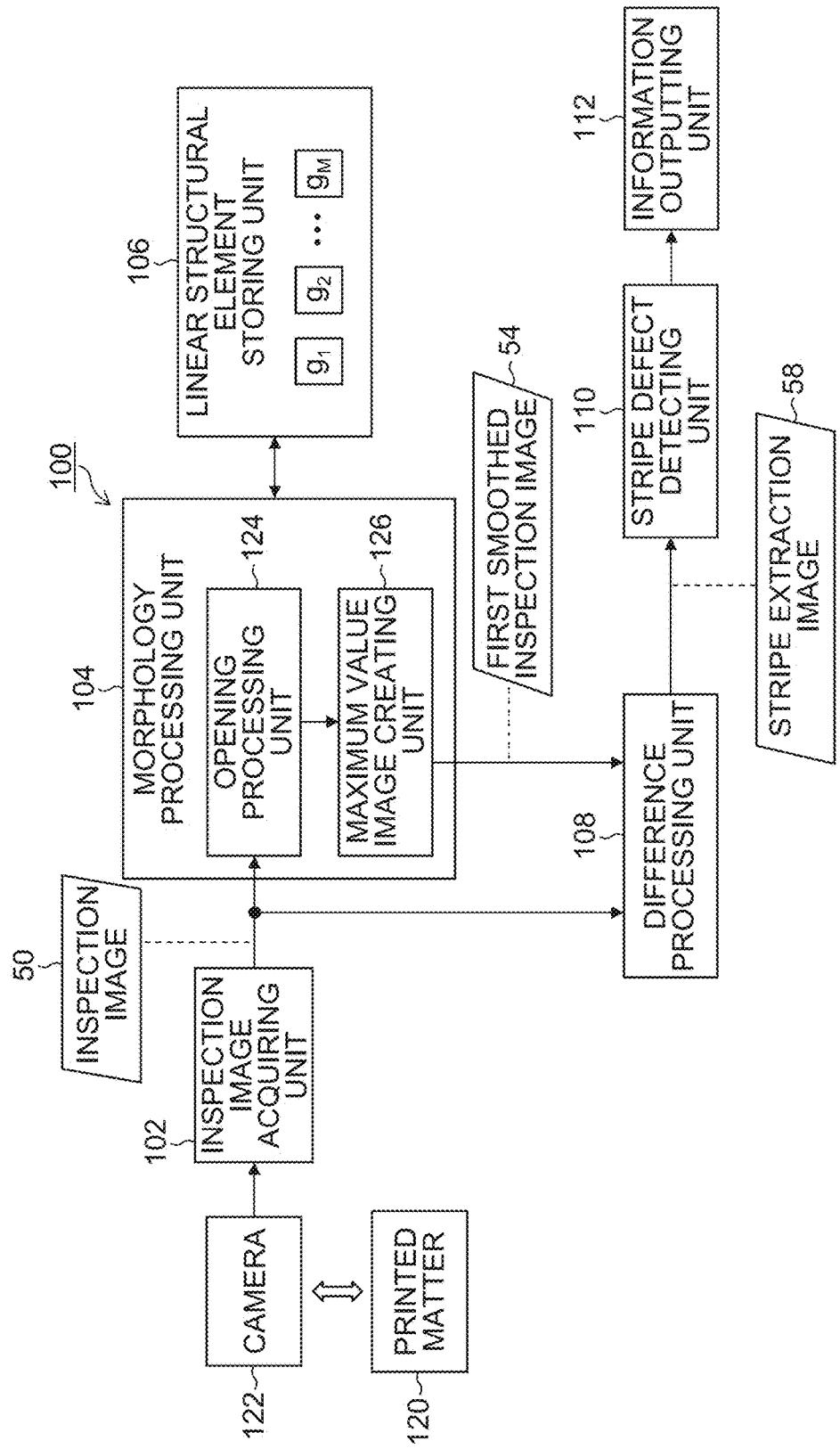
FIG. 18 is a block diagram showing a configuration of an image inspection apparatus according to the first embodiment.

Next, a configuration of an image inspection apparatus that carries out the image inspection method of each embodiment described above will be described. FIG. 18 is a block diagram showing a configuration of an image inspection apparatus 100 according to the first embodiment. Functions of each unit of the image inspection apparatus 100 can be realized by a combination of hardware of a computer and software. The software is synonymous with a program.

The image inspection apparatus 100 includes an inspection image acquiring unit 102, a morphology processing unit 104, a linear structural element storing unit 106, a difference processing unit 108, a stripe defect detecting unit 110, and an information outputting unit 112. The inspection image acquiring unit 102 is an interface that imports data of an inspection image 50 from another circuit outside of the apparatus or in the apparatus.

The inspection image 50 is grayscale image data obtained by a camera 122 imaging a printed matter 120 printed by a line-head ink jet printing apparatus not shown. The camera 122 is equivalent to a mode of an imaging device. The image inspection apparatus 100 may include the camera 122 or may not include the camera 122.

The morphology processing unit 104 includes an opening processing unit 124 and a maximum value image creating unit 126. A closing processing unit can be included in place of or in addition to the opening processing unit 124, and a minimum value image creating unit can be included in place of or in addition to the maximum value image creating unit 126.

At least one non-scanning direction linear structural element $g_i$ (i=1,2,3, . . . M) is stored in the linear structural element storing unit 106. M denotes the number of structural elements and is an integer equal to or greater than 1. A set of M non-scanning direction linear structural elements will be called a non-scanning direction linear structural element group.

The opening processing unit 124 executes the process of step S22 of FIG. 3. The maximum value image creating unit 126 executes the process of step S24 of FIG. 3. The difference processing unit 108 uses the first smoothed inspection image 54 generated by the maximum value image creating unit 126 and the inspection image 50 to execute the top-hat conversion process described in step S26 of FIG. 3.

The stripe defect detecting unit 110 executes the detection process of the stripe defect described in step S14 of FIG. 2 based on a stripe extraction image 58 that is the difference image created by the difference processing unit 108.

The information outputting unit 112 is an output interface that outputs stripe defect detection information detected by the stripe defect detecting unit 110.

The inspection image acquiring unit 102 is equivalent to a mode of an "inspection image acquiring device". The morphology processing unit 104 is equivalent to a mode of a "first smoothed inspection image creating device". The stripe defect detecting unit 110 is equivalent to a mode of a "stripe defect detecting device".

Configuration of Image Inspection Apparatus according to Second Embodiment

Figure 19:
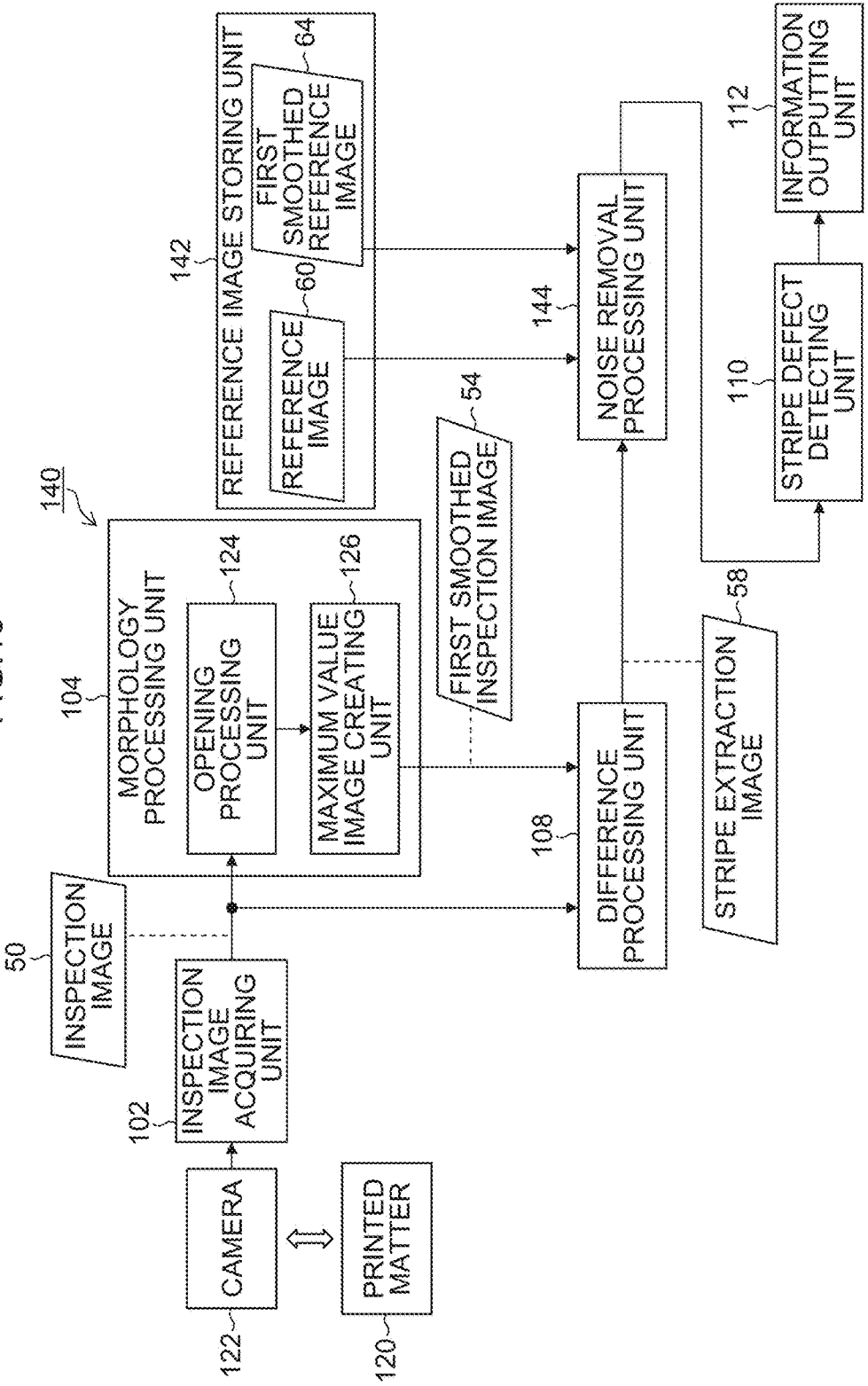
FIG. 19 is a block diagram showing a configuration of an image inspection apparatus according to the second embodiment.

FIG. 19 is a block diagram showing a configuration of an image inspection apparatus 140 according to the second embodiment. In FIG. 19, the same numerals are provided to the same or similar elements as in the configuration illustrated in FIG. 18, and the description will not be repeated. The linear structural element storing unit 106 shown in FIG. 11 is not illustrated in FIG. 19 to simplify the description.

The image inspection apparatus 140 according to the second embodiment shown in FIG. 19 includes a reference image storing unit 142 and a noise removal processing unit 144. The reference image 60 prepared in advance and the first smoothed reference image 64 are stored in the reference image storing unit 142. The first smoothed reference image 64 is equivalent to the morphology processing result image 62 obtained in step S42 of FIG. 11.

The noise removal processing unit 144 uses the reference image 60 and the first smoothed reference image 64 to apply the process of noise removal described in Formula 4 to the stripe extraction image 58 created by the difference processing unit 108. The stripe defect detecting unit 110 determines whether there is a stripe defect based on the image after noise removal obtained by the execution of the noise removal process by the noise removal processing unit 144.

As is apparent from Formula 4, the data of the reference difference image that is the difference image after the difference processing (top-hat conversion process) obtained by subtracting the reference image 60 from the first smoothed reference image 64 may be prepared in advance, and the reference difference image may be used to carry out the noise removal process. The reference difference image can be stored in the reference image storing unit 142 in place or in addition to the reference image 60 and the first smoothed reference image 64.

Configuration of Image Inspection Apparatus According to Third Embodiment

A closing processing unit can be adopted in place of the opening processing unit 124 shown in each of FIGS. 18 and 19, and a minimum value image creating unit can be adopted in place of the maximum value image creating unit 126.

Configuration of Image Inspection Apparatus According to Fourth Embodiment

Figure 20:
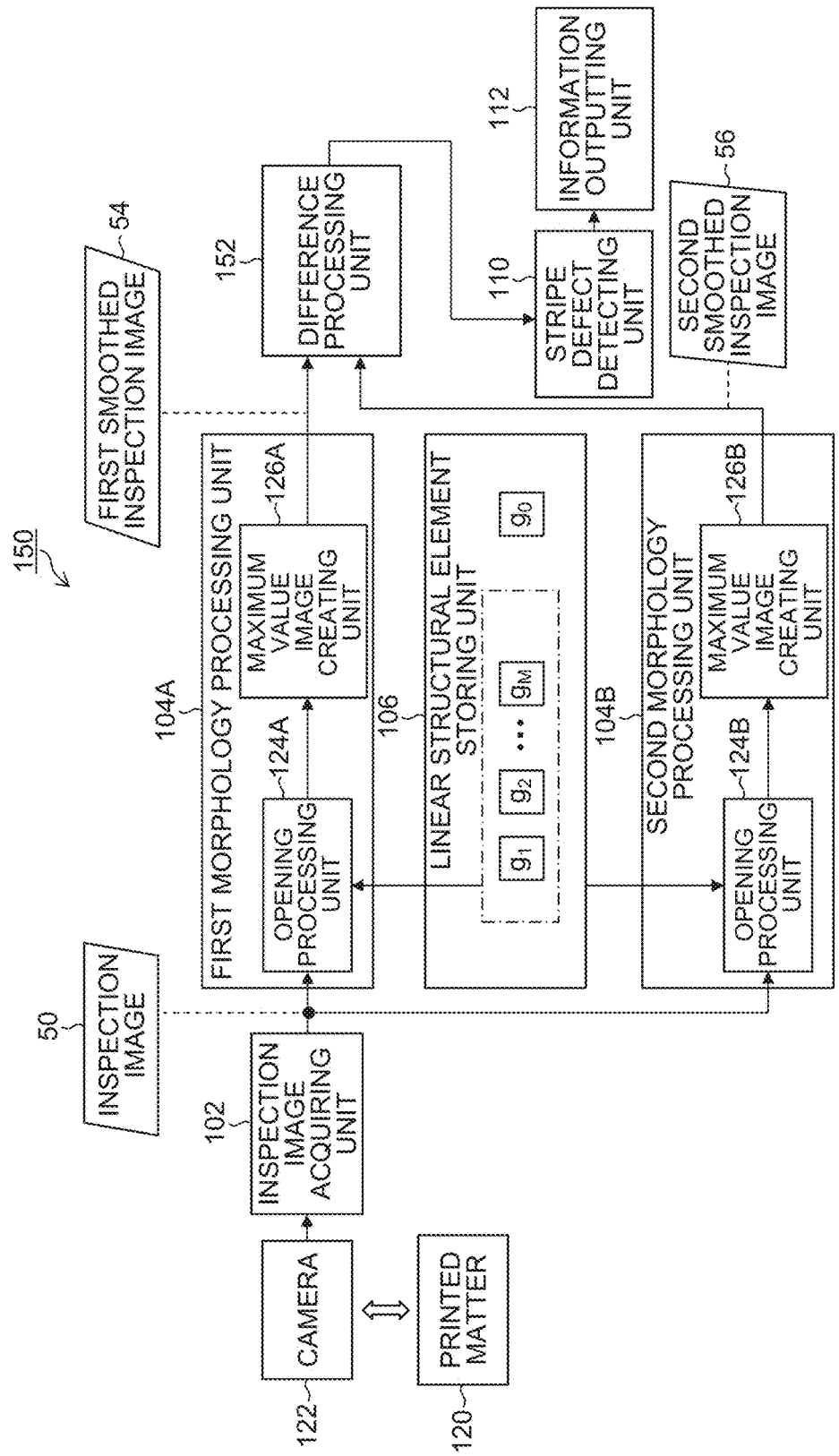
FIG. 20 is a block diagram showing a configuration of an image inspection apparatus according to the fourth embodiment.

FIG. 20 is a block diagram showing a configuration of an image inspection apparatus 150 according to a fourth embodiment. In FIG. 20, the same numerals are provided to the same or similar elements as in the configuration illustrated in FIG. 18, and the description will not be repeated. The image inspection apparatus 150 according to the fourth embodiment shown in FIG. 20 includes a first morphology processing unit 104A, a second morphology processing unit 104B, and a difference processing unit 152.

At least one non-scanning direction linear structural element that is set in advance and the scanning direction linear structural element are stored in the linear structural element storing unit 106. In FIG. 20, a set of non-scanning direction linear structural elements $g_i(i=1,2 \ldots M)$ surrounded by an alternate long and short dash line indicates the non-scanning direction linear structural element group, and the scanning direction linear structural element is written as "$g_0$". When a direction close to the scanning direction is assumed as the scanning direction, a plurality of scanning direction linear structural elements can be set. At least one scanning direction linear structural element that is set in advance will be called a scanning direction linear structural element group.

The first morphology processing unit 104A executes a process equivalent to the morphology processing unit 104 of FIG. 18. The first morphology processing unit 104A of FIG. 20 includes an opening processing unit 124A and a maximum value image creating unit 126A, and the opening processing unit 124A and the maximum value image creating unit 126A are equivalent to the opening processing unit 124 and the maximum value image creating unit 126 described in FIG. 18, respectively. The opening processing unit 124A of the first morphology processing unit 104A uses each of the non-scanning direction linear structural elements to execute the opening process. The first morphology processing unit 104A creates the first smoothed inspection image 54.

The second morphology processing unit 104B includes an opening processing unit 124B and a maximum value image creating unit 126B and executes morphology processing of the grayscale image. The opening processing unit 124B of the second morphology processing unit 104B uses each of the linear structural elements in all directions including the non-scanning direction linear structural element group and the scanning direction linear structural element group to execute the opening process. The maximum value image creating unit 126B creates the maximum value image based on each image after opening process obtained by the opening processing unit 124B. The second morphology processing unit 104B creates the second smoothed inspection image 56.

The difference processing unit 152 uses the first smoothed inspection image 54 created by the first morphology processing unit 104A and the second smoothed inspection image 56 created by the second morphology processing unit 104B to subtract the first smoothed inspection image 54 from the second smoothed inspection image 56 to create the difference image. The difference processing unit 152 executes the process described in Formula 8.

The stripe defect detecting unit 110 determines whether there is a stripe defect based on the image after isolated point removal that is the difference image created by the difference processing unit 152.

The first morphology processing unit 104A can be thought of as a first smoothed inspection image creating device. The second morphology processing unit 104B can be thought of as a second smoothed inspection image creating device.

Configuration of Image Inspection Apparatus according to Fifth Embodiment

Figure 21:
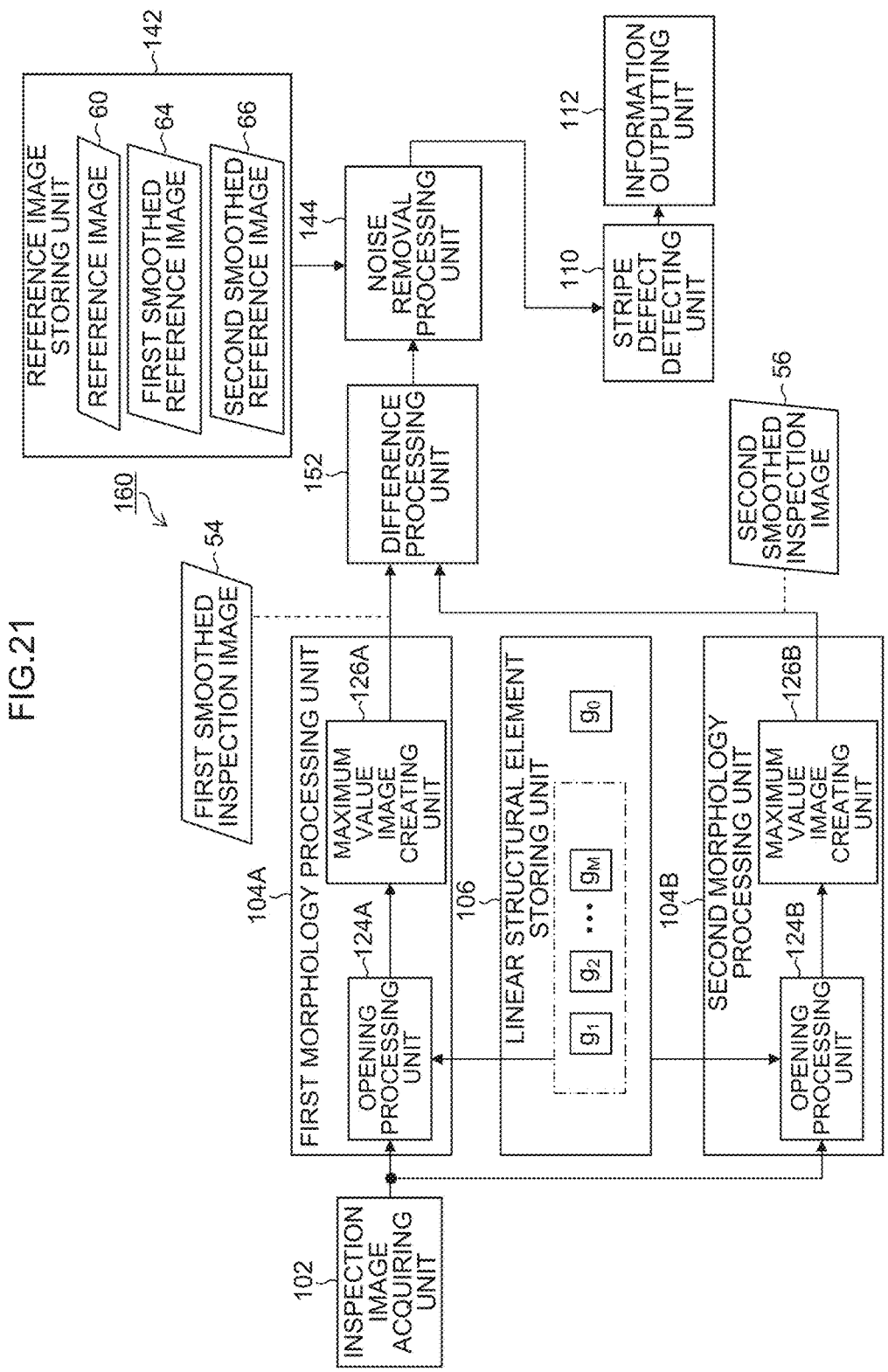
FIG. 21 is a block diagram showing a configuration of an image inspection apparatus according to the fifth embodiment.

FIG. 21 is a block diagram showing a configuration of an image inspection apparatus 160 according to the fifth embodiment. In FIG. 21, the same numerals are provided to the same or similar elements as in the configuration illustrated in FIGS. 18 to 20, and the description will not be repeated. The printed matter 120 and the camera 122 shown in FIG. 18 are not illustrated in FIG. 21 to simplify the illustration.

The first smoothed reference image 64 and the second smoothed reference image 66 created from the reference image 60 are stored in the reference image storing unit 142 of the image inspection apparatus 160 according to the fifth embodiment illustrated in FIG. 21. The first smoothed reference image 64 is created in the first morphology processing described in step S82 of FIG. 17. The second smoothed reference image 66 is created in the second morphology processing described in step S84 of FIG. 17.

The noise removal processing unit 144 executes the process of handling the linear structural components in the scanning direction included in the reference image 60 as noise components to remove the noise components from the image after isolated point removal created by the difference processing unit 152. The noise removal processing unit 144 uses the first smoothed reference image 64 and the second smoothed reference image 66 stored in the reference image storing unit 142 to execute the noise remove process described in Formula 9 to create the image after noise removal. Therefore, the noise removal processing unit 144 executes the noise removal process described in step S77 of FIG. 17.

The stripe defect detecting unit 110 determines whether there is a stripe defect based on the image after noise removal created by the noise removal processing unit 144.

As is apparent from Formula 9, the data of the reference difference image after isolated point removal that is the difference image obtained by subtracting the first smoothed reference image 64 from the second smoothed reference image 66 may be prepared in advance, and the reference difference image after isolated point removal may be used to carry out the noise removal process. The reference difference image after isolated point removal can be stored in the reference image storing unit 142 in place of or in addition to the reference image 60, the first smoothed reference image 64, and the second smoothed reference image 66.

The difference processing unit 152 can be eliminated, and the noise removal processing unit 144 can use the first smoothed inspection image 54, the second smoothed inspection image 56, the first smoothed reference image 64, and the second smoothed reference image 66 to create the image after noise removal according to Formula 9.

The processing unit that executes the process of creating the first smoothed reference image 64 from the reference image 60 can be thought of as a first smoothed reference image creating device. The processing unit that executes the process of creating the second smoothed reference image 66 from the reference image 60 can be thought of as a second smoothed reference image creating device.

[Example of Configuration of Ink Jet Printing Apparatus]

Figure 22:
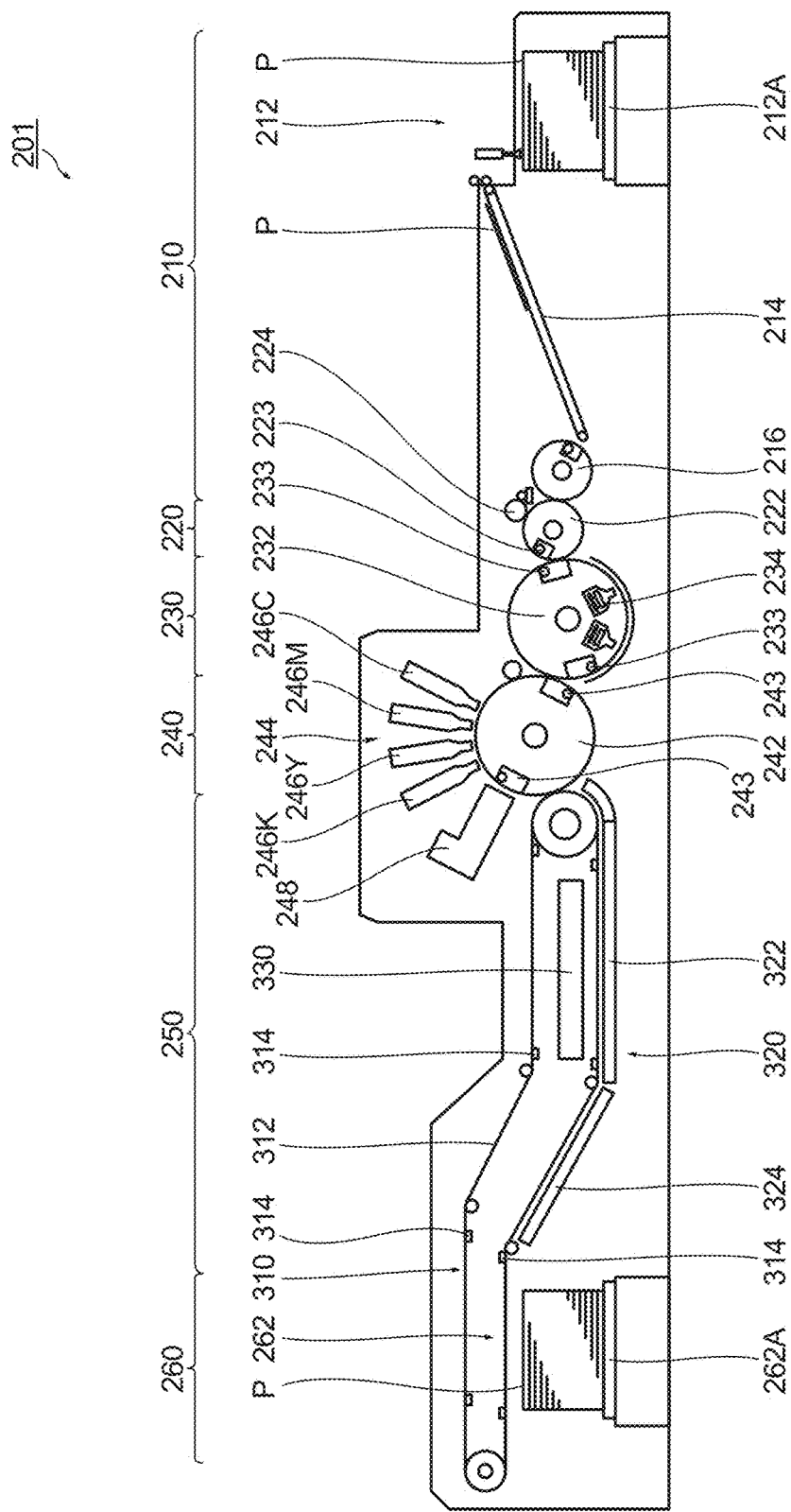
FIG. 22 is a side view showing a configuration of an ink jet printing apparatus according to the embodiments.

FIG. 22 is a side view showing a configuration of an ink jet printing apparatus 201 according to an embodiment. The term "printing apparatus" is synonymous with terms, such as a printing device, a printer, an image recording apparatus, an image forming apparatus, and an image outputting apparatus.

The ink jet printing apparatus 201 is a sheet-fed line-head ink jet printing apparatus in which a line head prints a color image on sheet paper P. The ink jet printing apparatus 201 includes a paper feeding unit 210, a processing liquid applying unit 220, a processing liquid drying unit 230, a drawing unit 240, an ink drying unit 250, and a stacking unit 260.

The paper feeding unit 210 automatically feeds the paper P one by one. The paper feeding unit 210 includes a paper feeding apparatus 212, a feeder board 214, and a paper feeding drum 216. The type of the paper P is not particularly limited, and for example, cellulose-based print paper, such as high-quality paper, coated paper, and art paper, can be used. The paper P is equivalent to a mode of a medium that records an image. A large number of pieces of paper P are stacked in a bundle and placed on a paper feed stand 212A.

The paper feeding apparatus 212 sequentially takes out, one by one from the top, the paper P in a bundle that is set in the paper feed stand 212A and feeds the paper P to the feeder board 214. The feeder board 214 transfers the paper P received from the paper feeding apparatus 212 to the paper feeding drum 216.

The paper feeding drum 216 receives the paper P fed from the feeder board 214 and transfers the received paper P to the processing liquid applying unit 220.

The processing liquid applying unit 220 applies a processing liquid to the paper P. The processing liquid is a liquid with a function of agglutinating, insolubilizing, and thickening the color material components in the ink. The processing liquid applying unit 220 includes a processing liquid applying drum 222 and a processing liquid applying apparatus 224.

The processing liquid applying drum 222 receives the paper P from the paper feeding drum 216 and transfers the received paper P to the processing liquid drying unit 230. The processing liquid applying drum 222 includes a gripper 223 on a peripheral surface, and the gripper 223 grips and rotates a tip portion of the paper P. In this way, the processing liquid applying drum 222 winds the paper P around the peripheral surface and conveys the paper P.

The processing liquid applying apparatus 224 applies the processing liquid to the paper P conveyed by the processing liquid applying drum 222. A roller applies the processing liquid.

The processing liquid drying unit 230 applies a drying process to the paper P provided with the processing liquid. The processing liquid drying unit 230 includes a processing liquid drying drum 232 and a warm air blower 234. The processing liquid drying drum 232 receives the paper P from the processing liquid applying drum 222 and transfers the received paper P to the drawing unit 240. The processing liquid drying drum 232 includes grippers 233 on a peripheral surface. As the grippers 233 grip and rotate a tip portion of the paper P, the processing liquid drying drum 232 conveys the paper P.

The warm air blower 234 is installed inside of the processing liquid drying drum 232. The warm air blower 234 blows out warm air to the paper P conveyed by the processing liquid drying drum 232 to dry the processing liquid.

The drawing unit 240 includes a drawing drum 242, a head unit 244, and an in-line sensor 248. The drawing drum 242 receives the paper P from the processing liquid drying drum 232 and transfers the received paper P to the ink drying unit 250. The drawing drum 242 includes grippers 243 on the peripheral surface, and the grippers 243 grip and rotate the tip of the paper P. In this way, the drawing drum 242 winds the paper P around the peripheral surface and conveys the paper P. The drawing drum 242 includes an attachment mechanism not shown that attaches the paper P wound around the peripheral surface to the peripheral surface to convey the paper P. A negative pressure is used for the attachment. The drawing drum 242 includes a large number of attachment holes on the peripheral surface and attaches the paper P to the peripheral surface by sucking the paper P from the inside through the attachment holes.

The head unit 244 includes ink jet heads 246C, 246M, 246Y, and 246K. The ink jet head 246C is a recording head that ejects droplets of cyan (C) ink. The ink jet head 246M is a recording head that ejects droplets of magenta (M) ink. The ink jet head 246Y is a recording head that ejects droplets of yellow (Y) ink. The ink jet head 246K is a recording head that ejects droplets of black (K) ink. Ink tanks not shown that are ink supply sources of corresponding colors supply the inks to respective ink jet heads 246C, 246M, 246Y, and 246K through piping routes not shown.

Each of the ink jet heads 246C, 246M, 246Y, and 246K includes a line head corresponding to the paper width, and each nozzle surface is arranged to oppose the peripheral surface of the drawing drum 242. The paper width here denotes a paper width in a direction orthogonal to the conveyance direction of the paper P. The ink jet heads 246C, 246M, 246Y, and 246K are arranged at certain intervals along the route of the paper P conveyed by the drawing drum 242.

Although not shown, a plurality of nozzles that are ejection ports of ink are two-dimensionally arranged on a nozzle surface of each of the ink jet heads 246C, 246M, 246Y, and 246K. The "nozzle surface" is an ejection surface provided with the nozzles and is synonymous with terms, such as an "ink ejecting surface" and a "nozzle forming surface". The nozzle arrangement of the plurality of two-dimensionally arranged nozzles will be called "two-dimensional nozzle arrangement".

Each of the ink jet heads 246C, 246M, 246Y, and 246K can be formed by connecting a plurality of head modules in the paper width direction. Each of the ink jet heads 246C, 246M, 246Y, and 246K is a full-line recording head including a nozzle array that can record an image at a prescribed recording resolution by one scan in the entire recording area of the paper P regarding the paper width direction orthogonal to the conveyance direction of the paper P. The full-line recording head is also called a page-wide head. The prescribed recording resolution may be a recording resolution that is set in advance by the ink jet printing apparatus 201. The prescribed recording resolution may be a recording resolution selected and set by the user or may be a recording resolution automatically selected and set by a program according to the print mode. The recording resolution can be, for example, 1200 dpi. The unit dpi (dot per inch) indicates the number of dots per inch. The paper width direction orthogonal to the conveyance direction of the paper P will be called a nozzle array direction of the line head in some cases, and the conveyance direction of the paper P will be called a nozzle array perpendicular direction in some cases.

In the case of the ink jet head with the two-dimensional nozzle arrangement, a projected nozzle array obtained by projecting (orthographic projection) each nozzle in the two-dimensional nozzle arrangement in the nozzle array direction can be considered to be equivalent to a row of nozzle array in which the nozzles are arranged at substantially equal intervals at a nozzle density for attaining the maximum recording resolution in the nozzle array direction. The "substantially equal intervals" denotes that droplet striking points that can be recorded in the ink jet printing apparatus are at substantially equal intervals. For example, a case in which the nozzles are at slightly difference intervals considering the movement of the droplets on the medium due to manufacturing errors or impact interference is also included in the concept of "equal intervals". Considering the projected nozzle array (also called "substantial nozzle array"), nozzle numbers indicating the nozzle positions of the nozzles can be associated with the order of arrangement of the projected nozzles arranged in the nozzle array direction.

The arrangement mode of the nozzles in each of the ink jet heads 246C, 246M, 246Y, and 246K is not limited, and various modes of nozzle arrangement can be adopted. For example, in place of the mode of the two-dimensional matrix arrangement, a linear arrangement with one row, a V-shaped nozzle arrangement, a polygonal-line nozzle arrangement such as a W-shaped arrangement with repetitions of V-shaped arrangement, and the like are also possible.

The ink jet heads 246C, 246M, 246Y, and 246K eject droplets of ink toward the paper P conveyed by the drawing drum 242. The ejected droplets are attached to the paper P, and an image is recorded on the paper P.

The drawing drum 242 functions as a device that relatively moves the ink jet heads 246C, 246M, 246Y, and 246K and the paper P. The drawing drum 242 moves the paper P relative to the ink jet heads 246C, 246M, 246Y, and 246K and is equivalent to a mode of a relative movement device. The ejection timing of each of the ink jet heads 246C, 246M, 246Y, and 246K is synchronized with a rotary encoder signal obtained from a rotary encoder (not shown in FIG. 1, numeral 382 in FIG. 23) installed on the drawing drum 242. The ejection timing is timing for ejecting the droplets of ink and is synonymous with droplet striking timing.

Although the configuration of standard colors (four colors) of CMYK is illustrated in the present example, the combination of the ink colors and the number of colors is not limited to the present embodiment, and light ink, dark ink, special color ink, and the like may be added as necessary. For example, an ink jet head that ejects light ink (pale ink), such as light cyan and light magenta, can be added, and an ink jet head that ejects special color ink, such as green and orange, can be added. Furthermore, the order of arrangement of the ink jet heads of each color is not particularly limited.

The in-line sensor 248 is an image reading unit that reads the image recorded on the paper P by the ink jet heads 246C, 246M, 246Y, and 246K. The in-line sensor 248 includes, for example, a line scanner using a CCD (charge-coupled device) line sensor.

The in-line sensor 248 is equivalent to a mode of an imaging device. The in-line sensor 248 can play a role of the camera 122 described in FIG. 18.

The stripe defect of the printed matter is detected based on the data of the read image read by the in-line sensor 248. Information, such as density of image and poor ejection of the ink jet heads 246C, 246M, 246Y, and 246K, is obtained based on the data of the read image read by the in-line sensor 248.

Although not shown, the camera 122 may be installed on the ink jet printing apparatus 201 in addition to the in-line sensor 248. When both of the in-line sensor 248 and the camera 122 are used, it is desirable that the installation location of the camera 122 is on the downstream of the in-line sensor 248 in the medium conveyance direction. For example, the camera 122 is installed at a position for imaging the printed matter after the end of a drying process by the ink drying unit 250.

The ink drying unit 250 applies the drying process to the paper P on which the image is recorded by the drawing unit 240. The ink drying unit 250 includes a chain delivery 310, a paper guide 320, and a warm air blowing unit 330.

The chain delivery 310 receives the paper P from the drawing drum 242 and transfers the received paper P to the stacking unit 260. The chain delivery 310 includes a pair of endless chains 312 that travel a prescribed travel route. Grippers 314 included in the pair of chains 312 grip the tip portion of the paper P and convey the paper P along the prescribed conveyance route. A plurality of grippers 314 are provided on the chains 312 at certain intervals.

The paper guide 320 is a member that guides the conveyance of the paper P by the chain delivery 310. The paper guide 320 includes a first paper guide 322 and a second paper guide 324. The first paper guide 322 guides the paper P conveyed through a first conveyance section of the chain delivery 310. The second paper guide 324 guides the paper conveyed through a second conveyance section on a subsequent stage of the first conveyance section. The warm air blowing unit 330 blows out warm air to the paper P conveyed by the chain delivery 310.

The stacking unit 260 includes a stacking apparatus 262 that receives and stacks the paper P conveyed from the ink drying unit 250 by the chain delivery 310.

The chain delivery 310 releases the paper P at a predetermined stacking position. The stacking apparatus 262 includes a stacking tray 262A and receives the paper P released from the chain delivery 310 to stack the paper P on the stacking tray 262A in a bundle. The stacking unit 260 is equivalent to a paper discharging unit.

Figure 23:
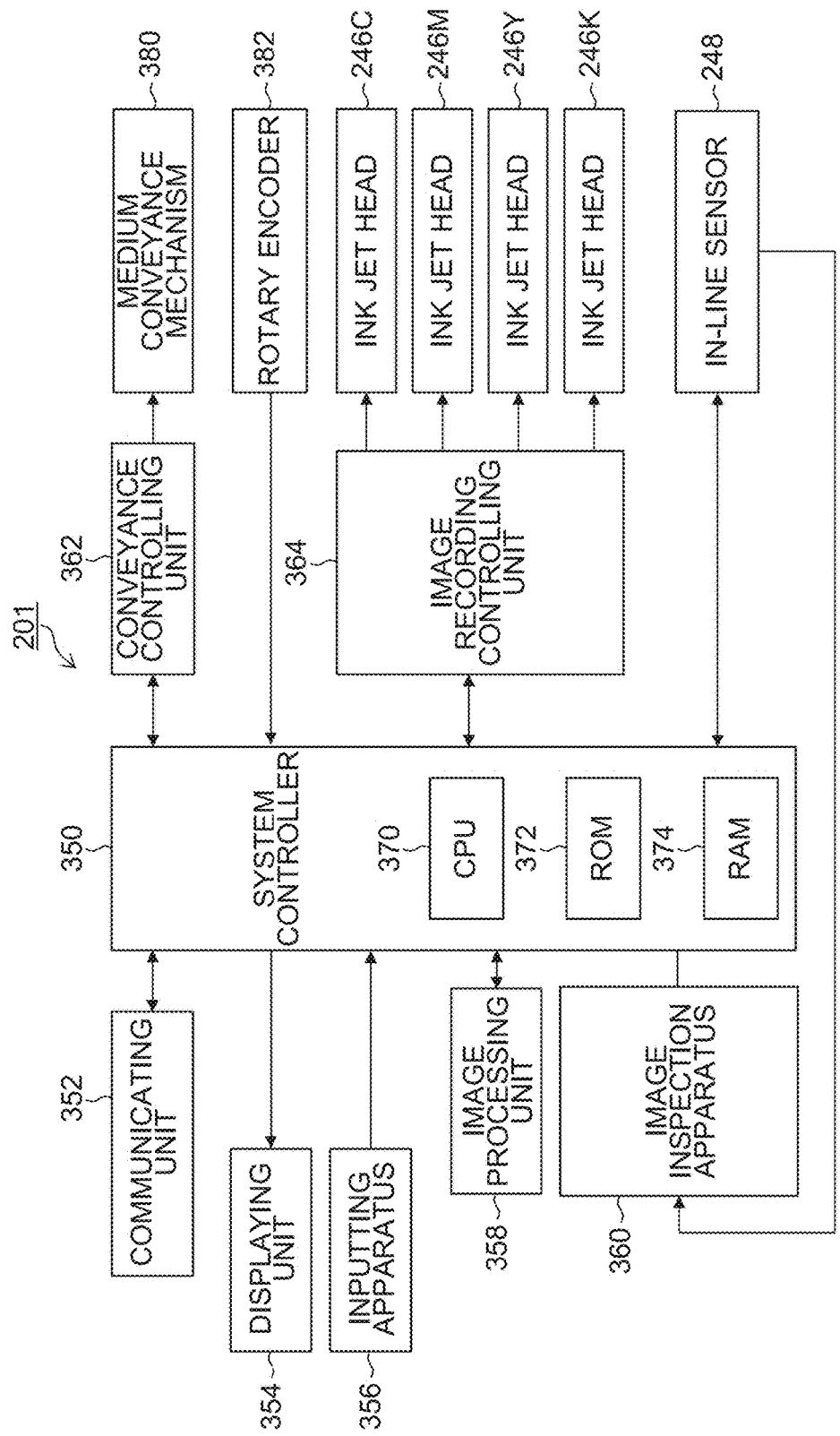
FIG. 23 is a block diagram showing a configuration of main parts of a control system of the ink jet printing apparatus.

FIG. 23 is a block diagram showing a configuration of main parts of a control system of the ink jet printing apparatus 201. As shown in FIG. 23, the ink jet printing apparatus 201 includes a system controller 350, a communicating unit 352, a displaying unit 354, an inputting apparatus 356, an image processing unit 358, an image inspection apparatus 360, a conveyance controlling unit 362, and an image recording controlling unit 364. These elements of each unit can be realized by one or a plurality of computers.

The system controller 350 functions as a controlling device that comprehensively controls each unit of the ink jet printing apparatus 201 and functions as an arithmetic device that performs various arithmetic processing. The system controller 350 includes a central processing unit (CPU; Central Processing Unit) 370, a read-only memory (ROM; read-only memory) 372, and a random access memory (RAM: random access memory) 374 and operates according to a predetermined control program. The ROM 372 stores programs executed by the system controller 350 and various data necessary for the control.

The communicating unit 352 includes a required communication interface. The ink jet printing apparatus 201 is connected to a host computer not shown through the communicating unit 352 and can transmit and receive data to and from the host computer. The "connection" here includes wired connection, wireless connection, or a combination of these. The communicating unit 352 may include a buffer memory for speeding up the communication.

The communicating unit 352 plays a role of an image input interface unit that acquires image data indicating an image to be printed.

The displaying unit 354 and the inputting apparatus 356 form a user interface. Various inputting apparatuses, such as a keyboard, a mouse, a touch panel, and a trackball, can be adopted as the inputting apparatus 356, and these apparatuses may be appropriately combined. A mode in which the displaying unit 354 and the inputting apparatus 356 are integrated is also possible, as in a configuration in which the touch panel is arranged on the screen of the displaying unit 354.

The operator can use the inputting apparatus 356 while viewing the content displayed on the screen of the displaying unit 354 to input various information, such as input of print conditions, selection of an image quality mode, setting of disabling of a failure determination function, input of other set matters, input/edit of attached information, and search of information. The operator can also check the details of the input and various other information through the display of the displaying unit 354. The displaying unit 354 functions as an error information notifying device that notifies error information. For example, stripe defect detection information indicating detection information of a stripe defect is displayed on the screen of the displaying unit 354 when the stripe defect is detected from the printed matter.

The image processing unit 358 executes various conversion processes and correction processes as well as a halftone process to the image data to be printed. The conversion processes include pixel count conversion, tone conversion, color conversion, and the like. The correction processes include density correction, non-firing correction for suppressing the visibility of the image defect caused by a non-firing nozzle, and the like. The image processing unit 358 executes the correction processes based on the read image obtained from the in-line sensor 248.

The image inspection apparatus 360 can have a configuration equivalent to one of the apparatus configurations of the image inspection apparatuses described in each embodiment of the first to fifth embodiments. For example, the image inspection apparatus 360 can have a configuration equivalent to the image inspection apparatus 100 described in FIG. 18. However, in the configuration of FIG. 23, the in-line sensor 248 plays a role of the camera 122 in FIG. 18.

The image inspection apparatus 360 may have a configuration equivalent to the image inspection apparatus 140 described in FIG. 19, may have a configuration equivalent to the image inspection apparatus 150 described in FIG. 20, and may have a configuration equivalent to the image inspection apparatus 160 described in FIG. 21.

The image inspection apparatus 360 may be a computer different from the controlling apparatus including the system controller 350 or may be provided as a functional block in the controlling apparatus including the system controller 350.

The conveyance controlling unit 362 controls a medium conveyance mechanism 380. The medium conveyance mechanism 380 includes the entire mechanism of the paper conveyance unit regarding the conveyance of the paper P from the paper feeding unit 210 to the stacking unit 260 described in FIG. 22. The medium conveyance mechanism 380 includes the paper feeding drum 216, the processing liquid applying drum 222, the processing liquid drying drum 232, the drawing drum 242, the chain delivery 310, and the like described in FIG. 22. The medium conveyance mechanism 380 includes a driving unit, such as a motor and a motor driving circuit, as a power source not shown.

The conveyance controlling unit 362 controls the medium conveyance mechanism 380 according to an instruction from the system controller 350 and controls the medium conveyance mechanism 380 to convey the paper P from the paper feeding unit 210 to the stacking unit 260 without delay.

The ink jet printing apparatus 201 includes the rotary encoder 382 as a device that detects the rotation angle of the drawing drum 242 (see FIG. 22) in the medium conveyance mechanism 380.

The ejection timing of each of the ink jet heads 246C, 246M, 246Y, and 246K is controlled according to the ejection timing signal generated from the rotary encoder signal output by the rotary encoder 382.

The image recording controlling unit 364 controls the drive of each of the ink jet heads 246C, 246M, 246Y, and 246K according to an instruction from the system controller 350. The image recording controlling unit 364 controls the ejection operation of each of the ink jet heads 246C, 246M, 246Y, and 246K based on dot data of each ink color generated through the halftone process of the image processing unit 358 in order to record a predetermined image on the paper P conveyed by the drawing drum 242.

<Program for Causing Computer to Function as Image Inspection Apparatus>

A program for causing a computer to function as the image inspection apparatus described in each embodiment described above can be recorded in a CD-ROM (Compact Disc Read-Only Memory), a magnetic disk, or other computer-readable media (tangible, non-transitory information storage medium), and the program can be provided through the information storage medium.

Instead of storing the program in the information storage medium to provide the program, a communication network, such as the Internet, can be used to provide the data of the program as a download service.

The program can be incorporated into the computer to cause the computer to realize the functions of the image inspection apparatus. Part or all of a program for realizing the print control including the functions of the image inspection process described in the present embodiments can be incorporated into a higher controlling apparatus, such as a host computer, or the program can be applied as an operation program of a central processing unit (CPU) of the ink jet printing apparatus.

Advantages of Embodiments (1) According to each embodiment described above, the linear structural elements in directions other than the scanning direction can be used to apply the morphology processing to the grayscale image to accurately extract the stripe information from the inspection image.

(2) Compared to a general method of using spatial filtering based on edge enhancement, the stripe extending in the scanning direction included in the inspection image information can be extracted without significantly degrading the stripe information in the embodiments of the present invention.

(3) In the embodiments of the present invention, the contour components of the image and the linear components other than the scanning direction that tend to cause a false detection in detecting the stripe defect can be removed. Therefore, the accuracy of the detection of the stripe defect can be increased.

Modified Examples of Embodiments

[Conveying Device of Paper]

The conveying device that conveys the medium is not limited to the drum conveyance system illustrated in FIG. 22. Various modes, such as a belt conveyance system, a nip conveyance system, a chain conveyance system, and a pallet conveyance system, can be adopted, and these systems can be appropriately combined.

[Medium for Image Formation]

The term "medium" used for recording an image is a general term of a thing called in various terms, such as paper, recording paper, print paper, print medium, printing medium, recording medium, medium for print, image formation medium, medium for image formation, image receiving medium, and medium for ejection. The quality, the shape, and the like of the paper are not particularly limited. Various sheet bodies, such as seal paper, resin sheet, film, cloth, non-woven fabric, can be used regardless of the quality and the shape. The sheet paper is not limited to cut paper organized in a prescribed size, and the sheet paper may be obtained by cutting continuous paper in a prescribed size on an as-needed basis.

The "image" is to be broadly interpreted, and the "image" includes a color image, a black and white image, a single color image, a gradation image, a uniform density (solid) image, and the like. The "image" is not limited to a photographic image and is used as a comprehensive term including drawing patterns, characters, symbols, line drawings, mosaic patterns, color painting patterns, and various other patterns or appropriate combinations of these. The "recording of image" includes concepts of terms, such as formation of image, printing, character printing, drawing, and print.

[Ejection System]

An ejector of the ink jet head includes: a nozzle that ejects liquid; a pressure chamber connected to the nozzle; and an ejection energy generating element that provides ejection energy to the liquid in the pressure chamber. As for the ejection system for ejecting droplets from the nozzle of the ejector, the device that generates the ejection energy is not limited to a piezoelectric element, and various ejection energy generating elements, such as a heater element and an electrostatic actuator, can be applied. For example, a system of ejecting droplets by using pressure of film boiling based on heating of liquid by the heater element can be adopted. A suitable ejection energy generating element is provided on the channel structure according to the ejection system of the liquid ejection head.

Configuration requirements of the embodiments of the present invention described above can be appropriately changed, added, or deleted without departing from the scope of the present invention. The present invention is not limited to the embodiments described above, and those with normal knowledge of the field can make many modifications within the technical scope of the present invention.

What is claimed is:

1. An image inspection method comprising:
  an inspection image acquisition step of acquiring an inspection image obtained by an imaging device imaging a printed matter printed by an ink jet printing apparatus comprising a line head;
  a first smoothed inspection image creation step of creating a first smoothed inspection image obtained by smoothing the inspection image by executing morphology processing of a grayscale image by respectively using non-scanning direction linear structural elements that are at least one linear structural element set as a structural element of an image and that are linear structural elements in directions not parallel to a scanning direction in moving a medium relative to the line head to scan the medium by the line head; and
  a stripe defect detection step of detecting a stripe defect extending in the scanning direction by using at least (1) one of the inspection image and a second smoothed inspection image created based on the inspection image and (2) the first smoothed inspection image.

2. The image inspection method according to claim 1, wherein
  a reference image is created in advance,
  a first smoothed reference image obtained by smoothing the reference image by morphology processing of a grayscale image is created by using at least one of the non-scanning direction linear structural elements, and
  the stripe defect is detected by using at least the inspection image, the first smoothed inspection image, the reference image, and the first smoothed reference image.

3. The image inspection method according to claim 2, wherein
  second preprocessing is applied to the reference image before execution of the morphology processing regarding the reference image, and the morphology processing is applied to the reference image after the application of the second preprocessing.

4. The image inspection method according to claim 3, wherein
first preprocessing is applied to the inspection image before execution of the morphology processing regarding the inspection image, and the morphology processing is applied to the inspection image after the application of the first preprocessing.

5. The image inspection method according to claim 2, wherein
the reference image is created based on image data used when the ink jet printing apparatus prints the printed matter.

6. The image inspection method according to claim 2, wherein
the reference image is a reference read image obtained by imaging a printed image without the stripe defect.

7. The image inspection method according to claim 1, further comprising
a second smoothed inspection image creation step of creating the second smoothed inspection image obtained by smoothing the inspection image by morphology processing of a grayscale image by using each of linear structural elements included in a linear structural element group including at least one of the non-scanning direction linear structural elements and at least one scanning direction linear structural element that is a linear structural element in the scanning direction, wherein
the stripe defect is detected by using at least the first smoothed inspection image and the second smoothed inspection image.

8. The image inspection method according to claim 7, wherein
a reference image is created in advance,
a first smoothed reference image obtained by smoothing the reference image by morphology processing of a grayscale image is created by using the at least one of the non-scanning direction linear structural elements,
a second smoothed reference image obtained by smoothing the reference image by morphology processing of a grayscale image is created by using each of linear structural elements included in a linear structural element group including the at least one of the non-scanning direction linear structural elements and the at least one scanning direction linear structural element that is the linear structural element in the scanning direction, and
the stripe defect is detected by using at least the first smoothed inspection image, the second smoothed inspection image, the first smoothed reference image, and the second smoothed reference image.

9. The image inspection method according to claim 1, wherein
first preprocessing is applied to the inspection image before execution of the morphology processing regarding the inspection image, and the morphology processing is applied to the inspection image after the application of the first preprocessing.

10. The image inspection method according to claim 1, wherein
when the inspection image is a color image, the first smoothed inspection image is created for each channel of a color signal.

11. The image inspection method according to claim 1, wherein
the number of the non-scanning direction linear structural elements is set according to a condition of at least one of accuracy of the detection and processing time required for the process of the detection.

12. The image inspection method according to claim 1, wherein
a filter size of each of the linear structural elements is adjusted according to thickness of the stripe defect to be detected and resolution of the imaging device.

13. The image inspection method according to claim 1, wherein
a linear structural element in a direction not parallel to the scanning direction and in which an angle relative to the scanning direction is smaller than a preset prescribed angle is assumed as a linear structural element in the scanning direction and is excluded from the non-scanning direction linear structural elements.

14. The image inspection method according to claim 1, wherein
the morphology processing
includes a process of at least one of an opening process and a closing process and
includes one of a maximum value image creation process of creating a maximum value image adopting a maximum value of each pixel from a processed image group obtained through the one of the processes and a minimum value image creation process of creating a minimum value image adopting a minimum value of each pixel from the processed image group obtained through the one of the processes.

15. A non-transitory computer-readable tangible medium recording a program for causing a computer to execute the image inspection method according to claim 1.

16. An image inspection apparatus comprising:
an inspection image acquiring device that acquires an inspection image obtained by an imaging device imaging a printed matter printed by an ink jet printing apparatus comprising a line head;
a first smoothed inspection image creating device that creates a first smoothed inspection image obtained by smoothing the inspection image by executing morphology processing of a grayscale image by respectively using non-scanning direction linear structural elements that are at least one linear structural element set as a structural element of an image and that are linear structural elements in directions not parallel to a scanning direction in moving a medium relative to the line head to scan the medium by the line head; and
a stripe defect detecting device that detects a stripe defect extending in the scanning direction by using at least (1) one of the inspection image and a second smoothed inspection image created based on the inspection image and (2) the first smoothed inspection image.

17. An ink jet printing apparatus comprising:
a line head including a nozzle array in which a plurality of nozzles that eject ink in an ink jet system are arranged;
a relative movement device that moves a medium relative to the line head;
an imaging device that obtains an inspection image by imaging a printed matter printed by attaching the ink ejected from the line head to the medium;
a first smoothed inspection image creating device that creates a first smoothed inspection image obtained by smoothing the inspection image by executing morphology processing of a grayscale image by respectively using non-scanning direction linear structural elements that are at least one linear structural element set as a structural element of an image and that are linear structural elements in directions not parallel to a scanning direction in moving the medium relative to the line head to scan the medium by the line head; and a stripe defect detecting device that detects a stripe defect extending in the scanning direction by using at least (1) one of the inspection image and a second smoothed inspection image created based on the inspection image and (2) the first smoothed inspection image.

* * * * *